United States Patent
Shibata et al.

(10) Patent No.: US 7,201,462 B2
(45) Date of Patent: Apr. 10, 2007

(54) INK JET PRINTING APPARATUS AND METHOD FOR CORRECTING EJECTION DRIVING

(75) Inventors: Tsuyoshi Shibata, Kanagawa (JP); Noribumi Koitabashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/622,479

(22) Filed: Jul. 21, 2003

(65) Prior Publication Data

US 2004/0104951 A1 Jun. 3, 2004

(30) Foreign Application Priority Data

Jul. 24, 2002 (JP) ............ 2002-215845
Jul. 24, 2002 (JP) ............ 2002-215846

(51) Int. Cl.
*B41J 29/393* (2006.01)
*B41J 29/38* (2006.01)
*B41J 2/205* (2006.01)

(52) U.S. Cl. ............. 347/19; 347/14; 347/15
(58) Field of Classification Search ........ 347/19, 347/14, 15
See application file for complete search history.

(56) References Cited

U.S. PATENT DOCUMENTS

| | | | |
|---|---|---|---|
| 4,723,129 A | 2/1988 | Endo et al. | |
| 4,740,796 A | 4/1988 | Endo et al. | |
| 5,528,270 A | 6/1996 | Tajika et al. | |
| 5,838,342 A * | 11/1998 | Takahashi et al. | 347/19 |
| 5,946,006 A | 8/1999 | Tajika et al. | |
| 6,116,714 A | 9/2000 | Imanaka et al. | |
| 6,419,342 B1 | 7/2002 | Bronswijk et al. | |
| 2001/0003458 A1 * | 6/2001 | Shioya | 347/19 |
| 2001/0038397 A1 | 11/2001 | Kobayashi et al. | |
| 2003/0086100 A1 | 5/2003 | Yashima et al. | |
| 2003/0103098 A1 | 6/2003 | Yashima et al. | |

FOREIGN PATENT DOCUMENTS

| | | |
|---|---|---|
| EP | 0 694 396 | 1/1996 |
| EP | 1 120 253 | 8/2001 |
| EP | 1 188 565 | 3/2002 |
| JP | 61-283273 | 12/1986 |
| JP | 3-33508 | 5/1991 |
| JP | 3-166959 | 7/1991 |
| JP | 4-44854 | 2/1992 |

(Continued)

*Primary Examiner*—Stephen Meier
*Assistant Examiner*—Julian D. Huffman
(74) *Attorney, Agent, or Firm*—Fitzpatrick, Cella, Harper & Scinto

(57) ABSTRACT

An ink jet printing apparatus, which can prevent unwanted visible bands or stripes from appearing in a printed image, performs a nozzle information generation step for generating nozzle information representing an ejection characteristic of each nozzle, according to a landing state on a print medium of an ink droplet ejected from each nozzle of the print head; an estimation step for estimating, based on the generated nozzle information and the print data, an effect that the ink droplet ejected from each nozzle has on the image to be formed; a correction information generation step for generating correction information to correct an ink ejection condition of each nozzle according to a result of estimation by the estimation step; and a control step for controlling a driving of the nozzles according to the correction information.

22 Claims, 17 Drawing Sheets

FOREIGN PATENT DOCUMENTS

| | | |
|---|---|---|
| JP | 6-79956 | 3/1994 |
| JP | 6-171078 | 6/1994 |
| JP | 7-242004 | 9/1995 |
| JP | 2000-318146 | 11/2000 |
| WO | WO 02/02329 | 1/2002 |

* cited by examiner

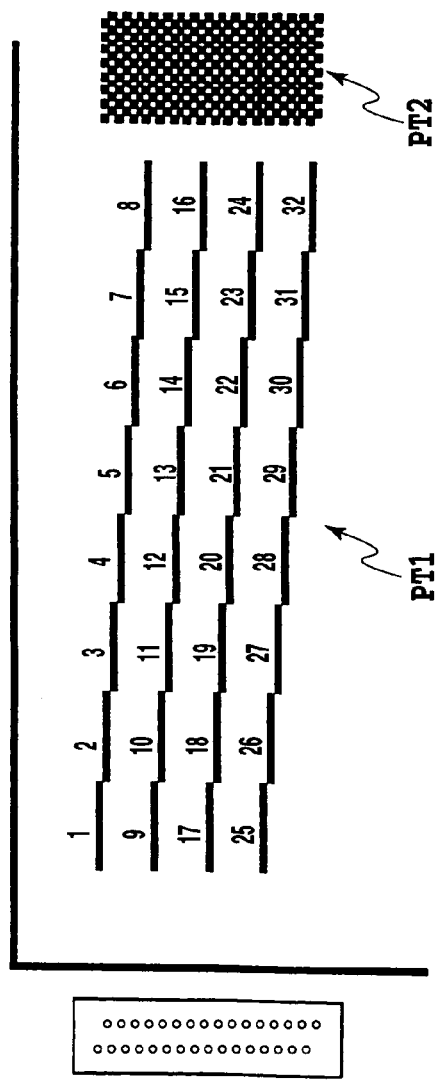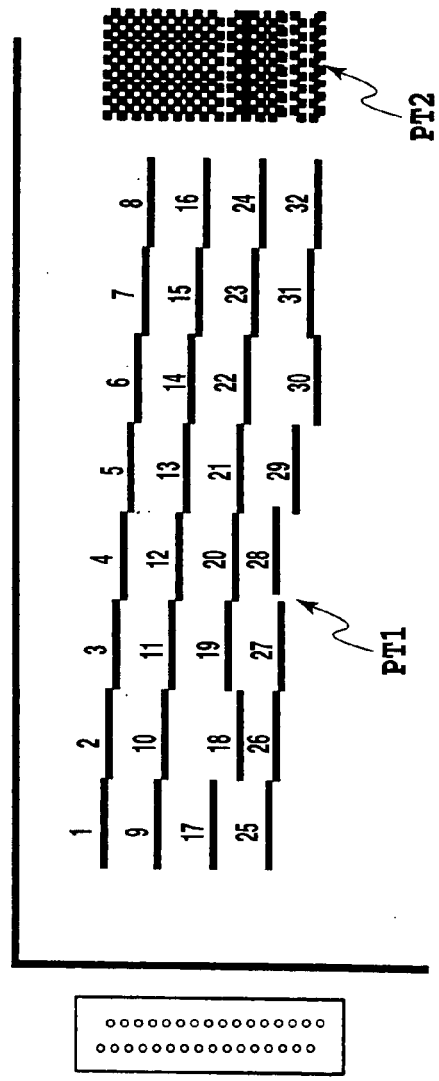
FIG.15A
FIG.15B

INK JET PRINTING APPARATUS AND METHOD FOR CORRECTING EJECTION DRIVING

This application claims priority from Japanese Patent Application Nos. 2002-215845 filed Jul. 24, 2002 and 2002-215846 filed Jul. 24, 2002, which are incorporated hereinto by reference.

BACKGROUND OF THE INVENTION

Field of the Invention

The present invention relates to an ink jet printing apparatus and an ink jet printing method which form an image by ejecting ink droplets from an ink jet print head having an array of nozzles. More specifically, the present invention relates to an ink jet printing apparatus and an ink jet printing method which analyze and correct causes of printed image quality degradations and thereby form a high-quality printed image.

It is noted that this invention is applicable to all apparatus that use print media such as paper, cloth, leather, nonwoven cloth, OHP sheets and even metal sheets. Examples of applicable devices include office equipment, such as printers, copying machines and facsimiles, and industrial manufacturing devices.

BRIEF DESCRIPTION OF THE RELATED ART

As information processing devices, such as copying machines, word processors and computers, and communication devices become more widespread, ink jet printing apparatus are rapidly proliferating as one of printing apparatus for outputting digital images processed by these devices. For faster printing speed, these printing apparatus use a print head having a large number of integrally formed nozzles each made up of an ink ejection opening and a liquid path. Further, with a growing trend toward information processing devices going color in recent years, there is an increasing demand on the printing apparatus for a color printing capability. To meet this demand, common ink jet printing apparatus employ a plurality of parallelly arranged print heads for ejecting ink droplets of different colors.

The ink jet printing apparatus ejects droplets of ink, a recording liquid, onto a print medium such as paper to form dots thereon. Since the ink jet printing apparatus keeps the print head out of contact with the print medium, a printing operation can be performed with low noise. Further, since the density of ink ejection nozzles can be increased, it is possible to enhance the resolution of an image and increase the speed of the printing operation inexpensively. Another advantage of the ink jet printing apparatus is that it does not require special processing such as development and fixing and can produce high-quality images on such print media as plain paper at low cost.

Because of these advantages, the ink jet printing apparatus have found a wide range of applications. Particularly, an on-demand type ink jet printing apparatus will attract an ever-increasing demand in the future since it can easily incorporate a color printing technology and can also be reduced in size and simplified. Further, as more and more printing apparatus adopt the color printing, there is an increasing trend for higher image quality and faster printing speed.

The conventional printing apparatus described above, however, have the following problems. In the conventional ink jet printing apparatus using ink jet print heads each having a plurality of arrayed nozzles, when one or more nozzles are clogged or fail to be driven normally for some reason, dots to be printed by these nozzles fail to be printed on a print medium. As such, unprinted portions appear in the form of bands (white bands or stripes) on an image, resulting in causing noticeable degradation of an image quality depending on the grade of appearance of stripe-like unprinted portions. Further, when one or more nozzles fall into an ejection state significantly different from that of other normal nozzles and if a printing operation is continued in this state, white bands or stripes due to uneven densities sometimes appear on the image, greatly impairing an image quality.

In the event that some nozzles fail to eject ink in an appropriate ejection state, it has been proposed to perform the following methods to alleviate image quality degradations caused by failed or faulty nozzles. The conventional methods that give priorities to an image quality include an ink ejection performance recovery method using a cleaning mechanism and a so-called multipass printing method that prints the same area of a print medium multiple times using a plurality of complementary nozzle groups to complete an image. The multipass printing method, however, has a problem that it takes a lot of time because a plurality of printing operations are performed on every single print area. The ejection performance recovery method using, for example, a cleaning technique also requires much time and consumes an additional volume of ink that does not contribute directly to printing. Because the ejection performance recovery method increases a running cost and is not desirable from an ecological point of view, it is desired that the number of times that the recovery operation is executed be limited to a minimum.

A technique using a so-called head shading to prevent density variations of a printed image and thereby improve a printed image quality has also been developed. A commonly known head shading technique involves printing a test pattern of a uniform grayscale value on a print medium, optically detecting density variations, and performing corrections, such as addition or subtraction, on the grayscale values of an output image as it is printed.

Further, in an ink jet printer having print heads each with a plurality of arrayed ink ejection nozzles, a test pattern of uniform grayscale value is output and print density deviations (or print density variations) are optically measured. It is assumed that the print density variations are caused by variations in ejection volume among nozzles. Efforts have been made to improve the density or ejection volume variations among nozzles as by correcting an ink ejection drive method according to the density variations or by performing a gamma correction of the grayscale on that part of an image corresponding each nozzle.

Such a technique to correct a density variation of a printed image is disclosed, for example, in Japanese Patent Application Publication No. 3-33508(1991), and Japanese Patent Application Laid-open Nos. 61-283273(1986), 3-166959 (1991), and 7-242004(1995). The above image quality improvement effort using the head shading, however, is basically intended to correct variations in volume of ink droplets ejected from each nozzle. For example, the head shading is not intended to improve the image quality to an optimum level when an ink droplet ejected from a faulty nozzle landed on a position significantly far from an ideal position, i.e., failed to land on an ideal position. Particularly in a full-multiple type ink jet printing apparatus using full-line heads of a so-called full-line printing system, which completes an image associated with a particular print head by performing only one scan of the print head relative to a print medium, there is a call for further image quality improvements.

To meet this requirement, the inventor of this invention also proposed the following ink jet printing apparatus. In this printing apparatus, measurements are made, for each print head, of deviations between actual positions on a print medium at which ink droplets ejected from individual nozzles landed and ideal landing positions on the print medium at which the ink droplets are intended to land (pixel formation positions on a print matrix). Then, nozzles that have caused ink droplets to deviate from the intended print matrix are identified. Image data and nearby image data corresponding to the identified nozzles is corrected to eliminate the landing position deviations.

This method is very useful because, if there is a variety of factors from ink ejection to flying to landing that cause ink droplet landing position deviations, a satisfactory image can be formed at all times regardless of the presence of such factors.

Furthermore, with so-called elongate print heads with nozzles arrayed over a distance in excess of one inch, a problem arises that a volume of image data to be processed becomes large when the nozzles are arranged at a high density of 300 dpi or more. For example, in a print head having nozzles arrayed at 600 dpi over an A4-size distance (about 8 inches), a total number of nozzles reaches as many as 4,800. Performing the above-mentioned deviation correction processing on all of these nozzles requires a huge volume of data to be processed. This takes a lot of time during printing, slowing down an operation speed of the apparatus as a whole. To eliminate this problem requires a costly processor capable of high-speed processing.

Further, if some trouble occurs with a part of the nozzle column, conventionally, due to the presence of such defective nozzle, the print head is obliged to be treated as a low quality print head, which may result in a disposal of the print head. In the case of elongate print heads, this practice wastes a large number of normally functioning nozzles, posing a serious problem in terms of cost and ecology.

Furthermore, such elongate nozzles as described above have a greater chance of experiencing nozzle ejection characteristic variations. For example, nozzles with ink ejection volume variations or those with landing position deviations may concentrate in some of the nozzles. In conventional practice, print heads with any defects are all disposed of as faulty products. However, among the print heads treated as faulty products, there are some products whose ejection volume variations and landing position deviations are small and which have only a few faulty nozzles. Making use of these discarded products will reduce a manufacturing cost of the apparatus and its realization is being called for.

SUMMARY OF THE INVENTION

The present invention has been accomplished with a view to overcoming the aforementioned drawbacks and provides an ink jet printing apparatus and an ink jet printing method which, if a print head has a faulty nozzle that projects ink droplets with a large deviation from an intended position, can prevent unwanted visible bands or stripes from showing in a printed image, thus assuring a high-quality image with an appropriate grayscale representation.

To achieve the above objective, the present invention has the following configuration.

In one aspect, the present invention provides an ink jet printing apparatus which forms an image on a print medium by moving a print head having an array of nozzles and the print medium relative to each other and at the same time ejecting ink droplets from the nozzles according to print data of the image to be printed, the ink jet printing apparatus comprising: a nozzle information generation means for generating nozzle information representing an ejection characteristic of each nozzle according to a landing state on the print medium of the ink droplet ejected from each nozzle; an estimation means for estimating, based on the nozzle information generated by the nozzle information generation means and the print data, an effect that the ink droplet ejected from each nozzle has on the image to be formed; a correction information generation means for generating correction information to correct an ink ejection condition of each nozzle according to a result of estimation by the estimation means; and a control means for controlling a driving of the nozzles according to the print data and the correction information.

In another aspect, the present invention provides an ink jet printing method which forms an image on a print medium by moving a print head having an array of nozzles and the print medium relative to each other and at the same time ejecting ink droplets from the nozzles according to print data of the image to be printed, the ink jet printing method comprising: a nozzle information generation step for generating nozzle information representing an ejection characteristic of each nozzle according to a landing state on the print medium of the ink droplet ejected from each nozzle; an estimation step for estimating, based on the nozzle information generated by the nozzle information generation step and the print data, an effect that the ink droplet ejected from each nozzle has on the image to be formed; a correction information generation step for generating correction information to correct an ink ejection condition of each nozzle according to a result of estimation by the estimation step; and a control step for controlling a driving of the nozzles according to the print data and the-correction information.

In still another aspect, the present invention provides an ink jet printing apparatus which forms an image on a print medium by moving a print head having an array of nozzles and the print medium relative to each other and at the same time ejecting ink droplets from the nozzles according to print data of the image to be printed, the ink jet printing apparatus comprising: a deviation correction means for performing an ink dot deviation correction based on deviation data representing an amount of deviation, or a difference, between an actual landing position of an ink dot formed on the print medium by the ink droplet ejected from each nozzle and an ideal landing position of the ink dot; and a control means for selectively causing the deviation correction means to execute the dot deviation correction according to the amount of deviation.

In a further aspect, the present invention provides an ink jet printing apparatus which forms an image on a print medium by moving a print head having an array of nozzles and the print medium relative to each other and at the same time ejecting ink droplets from the nozzles according to print data of the image to be printed, the ink jet printing apparatus comprising: a grayscale correction means for performing an ink dot grayscale correction according to density difference data representing a density difference between an actual density of an ink dot formed on the print medium and an ideal density of the dot; a deviation correction means for performing an ink dot deviation correction based on deviation data representing an amount of deviation, or a difference, between an actual landing position of an ink dot formed on the print medium by the ink droplet ejected from each nozzle and an ideal landing position of the ink dot; and a control means for controlling the grayscale correction means and the deviation correction means according to at least the density difference and the amount of deviation.

In a further aspect, the present invention provides an ink jet printing method which forms an image on a print medium by moving a print head having an array of nozzles and the print medium relative to each other and at the same time ejecting ink droplets from the nozzles according to print data of the image to be printed, the ink jet printing method comprising: a deviation correction step for performing an ink dot deviation correction based on deviation data representing an amount of deviation, or a difference, between an actual landing position of an ink dot formed on the print medium by the ink droplet ejected from each nozzle and an ideal landing position of the ink dot; and a control step for selectively causing the deviation correction step to execute the dot deviation correction according to the amount of deviation.

In a further aspect, the present invention provides an ink jet printing method which forms an image on a print medium by moving a print head having an array of nozzles and the print medium relative to each other and at the same time ejecting ink droplets from the nozzles according to print data of the image to be printed, the ink jet printing method comprising: a grayscale correction step for performing an ink dot grayscale correction according to density difference data representing a density difference between an actual density of an ink dot formed on the print medium and an ideal density of the dot; a deviation correction step for performing an ink dot deviation correction based on deviation data representing an amount of deviation, or a difference, between an actual landing position of an ink dot formed on the print medium by the ink droplet ejected from each nozzle and an ideal landing position of the ink dot; and a control step for controlling the grayscale correction means and the deviation correction means according to at least the density difference and the amount of deviation.

In this specification, the word "nozzles" means a construction that includes not only the openings through which to eject ink but also cylindrical liquid paths or spaces communicating with the openings and accommodating the ink and ejection energy generation means (e.g., electrothermal transducers, piezoelectric elements, etc.) for generating an energy to eject the ink in the liquid paths from the ejection openings.

With the invention having the above-described construction, since the dot deviation correction is performed based on the deviation data representing an amount of deviation, or a difference, between an actual landing position of an ink dot formed on the print medium by an ink droplet ejected from each nozzle of the print head and an ideal landing position of the ink dot and since the deviation correction means is made to selectively execute the dot deviation correction according to the amount of deviation, even if the print head has a faulty nozzle whose dot landing position greatly deviates from an intended position, it is possible to produce a high-quality image with no visible bands or stripes. Therefore, print heads with such faulty nozzles do not have to be replaced and can be used for a long period of time. Not only does this reduce the running cost of the apparatus significantly but it is also desirable from an ecological point of view. This invention therefore can practically improve a yield of print heads in a production line and reduce a production cost of the print heads.

Further, since the dot deviation correction by the deviation correction means can be executed only when the correction is found necessary based on the amount of deviation, the processing time required by the correction operation can be minimized, assuring an efficient printing operation.

The advantages of this invention described above are particularly notable with a printing system in which an image is completed with a single printing scan of a print head having an array of nozzles. This invention can also be applied to a so-called multipass printing in which one and the same print area is scanned multiple times by different nozzle groups. Undesired stripes or bands in a printed image that are already reduced by the multipass printing can further be reduced by this invention. This invention therefore is applicable to any type of ink jet printing system.

The above and other objects, effects, features and advantages of the present invention will become more apparent from the following description of embodiments thereof taken in conjunction with the accompanying drawings.

BRIEF DESCRIPTION OF THE DRAWINGS

FIG. 15A is an example step chart for identifying faulty nozzles in a print head, formed by a print head having normal nozzles;

FIG. 15B is an example step chart for identifying faulty nozzles in a print head, formed by a print head having faulty nozzles at 18th, 28th and 30th positions.

DETAILED DESCRIPTION OF PREFERRED EMBODIMENTS

Now, embodiments of the present invention will be described in detail by referring to the accompanying drawings.

Figure 1:
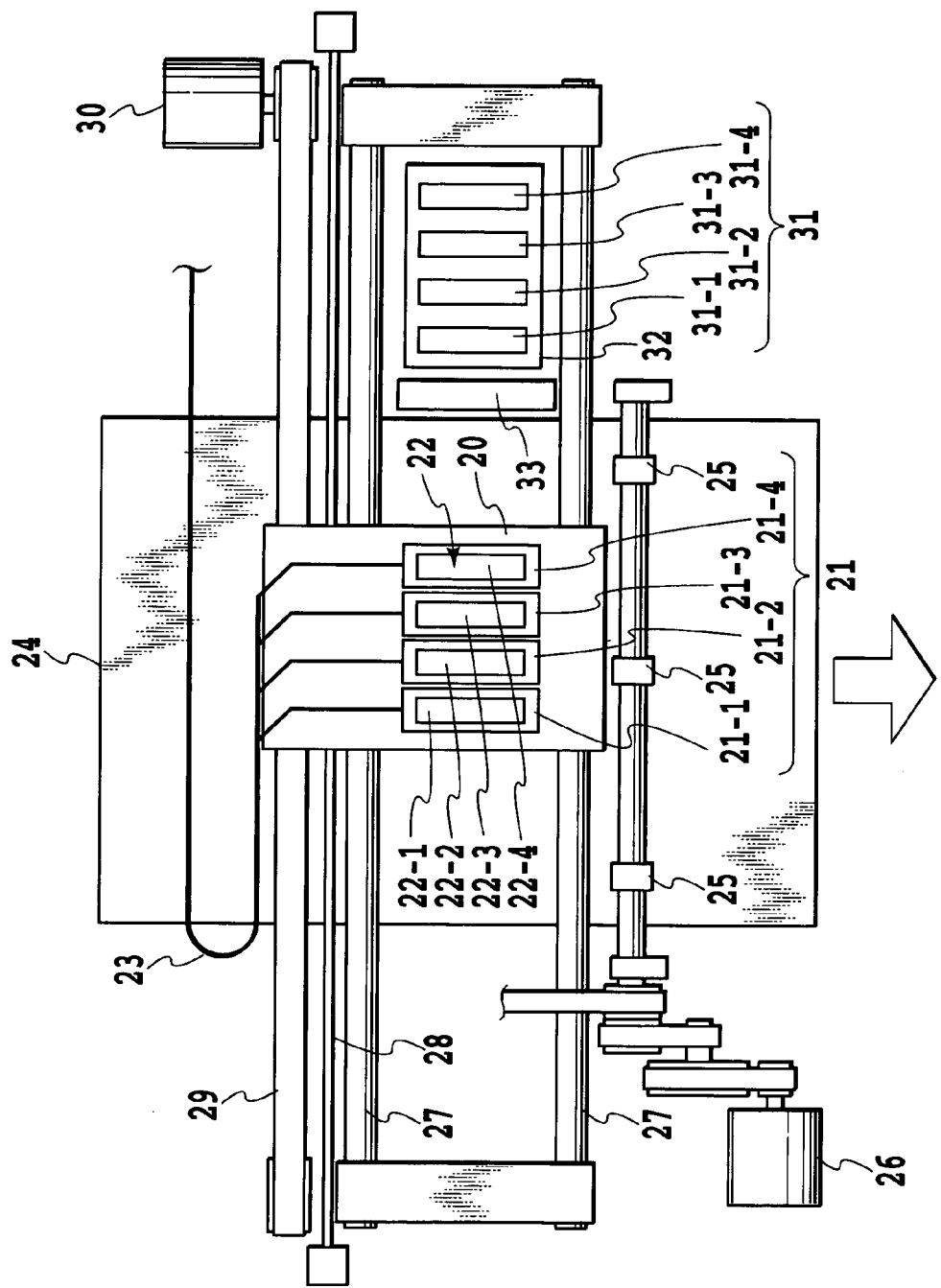
FIG. 1 is a front view showing an outline configuration of an ink jet printing apparatus according to one embodiment of the present invention.

FIG. 1 is a plan view showing an outline construction of an ink jet printing apparatus used in embodiments of the present invention. Mounted on a carriage 20 are a plurality of ink jet print heads 21 (21-1 to 21-4), each of which has an array of nozzles or ink ejection ports. Designated 21-1, 21-2, 21-3 and 21-4 are ink jet print heads (referred to simply as print heads) for ejecting a black (K), cyan (C), magenta (M) and yellow (Y) ink, respectively. In an inside (or liquid path) of each of the ink nozzles of each print head 21 is provided a heating element (electrothermal transducer) that generates a thermal energy for ejecting ink. Ink cartridges 22 each comprise an ink jet print head 21-1 to 21-4 and an ink tank 22-1 to 22-4.

Control and other signals to the ink jet print heads 21 are sent through a flexible cable 23. A print medium 24, such as OHP sheet, glossy paper, glossy film and postcard, is supplied through transport rollers not shown to pairs of opposing discharge rollers 25 that hold the print medium and are driven by a feed motor 26 to feed it in a direction of arrow (subscan direction). The carriage 20 is movably supported on a guide shaft 27 and a linear encoder 28. The carriage 20 is driven by a carriage motor 30 through a drive belt 29 to reciprocate along the guide shaft 27 in a main scan direction crossing (in this case, perpendicular to) the subscan direction. When the carriage 20 is reciprocally moved, a pulse signal output from the linear encoder 28 is counted to determine the current position of the carriage 20. As the carriage 20 is driven, the heating elements in the print heads 21 are energized according to the print signal to eject ink droplets onto a print medium to form an image.

At a home position of the carriage 20 which is set outside a printing operation region over the print medium in the main scan direction, a recovery unit 32 with a cap portion 31 is installed. When the printing operation is not performed, the carriage 20 is moved to the home position where ink ejection faces of the print heads 21 are hermetically capped with associated caps 31-1 to 31-4 of the cap portion 31 to prevent a possible clogging of the nozzles caused by increased viscosity of ink or solidified ink from ink solvent evaporation or by adhesion of foreign matter such as dust.

The capping function of the cap portion 31 is also used for an idle ejection, which causes the nozzles to eject ink into the cap portion 31, that is out of contact with the nozzles, to prevent a faulty ejection and clogging of those nozzles having low printing operation, frequencies. The capping function is also used to recover the ejection performance of faulty nozzles by activating a pump not shown to draw ink from the nozzles, with the ink ejection faces hermetically capped with the cap portion 31. Denoted 33 is an ink receiving portion. When each print head 21-1 to 21-4 passes over the ink receiving portion 33 immediately before starting a printing operation, the print head performs a preliminary ejection toward the ink receiving portion 33. Further, a wipe member (such as a blade) not shown is installed by the side of the cap portion 31 to clean the ink ejection faces of the print heads 21.

Figure 2:
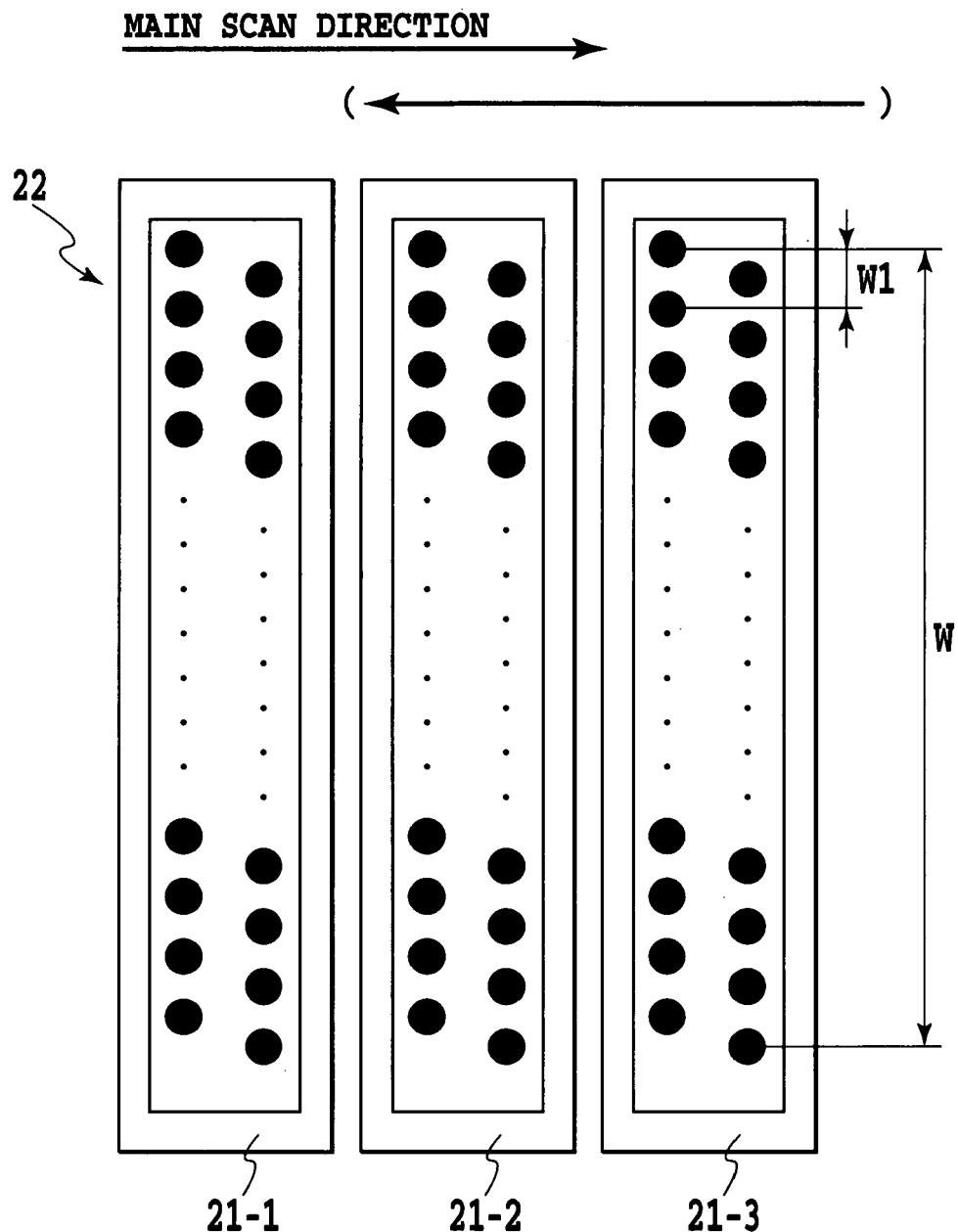
FIG. 2 is an enlarged schematic view showing a construction of an ink jet print head 21 of FIG. 1.

Next, FIG. 2 is an enlarged schematic diagram showing a construction of the print heads 21 described above. In FIG. 2, the print heads each have a large number of ink ejection nozzles n arrayed in a direction almost perpendicular to the main scan direction. While in this figure the nozzles in each print head are arranged in two columns, they may be arranged in one column or in three or more columns. They do not have to be arranged in a straight line.

Further, as shown in FIG. 2, an interval W1 between adjacent nozzles in the subscan direction is called a resolution of a print head or a nozzle pitch or a nozzle density.

The print heads can print on an area corresponding to a width W of the nozzle column by ejecting ink as they are moved in the direction of arrow (main scan direction). The printing operation (ink ejection operation) can be done in a forward or backward direction or in both directions. Further, the print heads are prepared in the same number as that of the ink colors used for printing. For example, when three colors, cyan, magenta and yellow, are used for full-color printing, three print heads are prepared. When a monochromatic printing is performed using only a black ink, one print head need only to be prepared. In a printing using dark and light inks, as many print heads as color inks, such as dark cyan, light cyan, dark magenta, light magenta, dark black, light black, dark yellow and light yellow, need to be prepared. It is also possible to use a print head for ejecting a special color ink.

The ink jet printing system applicable to this invention is not limited to the bubble jet (tradename) system using heating elements (heaters). For example, in a continuous type which continuously ejects ink droplets for atomization, a charge control system and a dispersion control system may be used. Further, in an on-demand type which ejects ink droplets as required, a pressure control system that ejects ink droplets from orifices by mechanical vibrations of piezoelectric elements may be employed.

Figure 3:
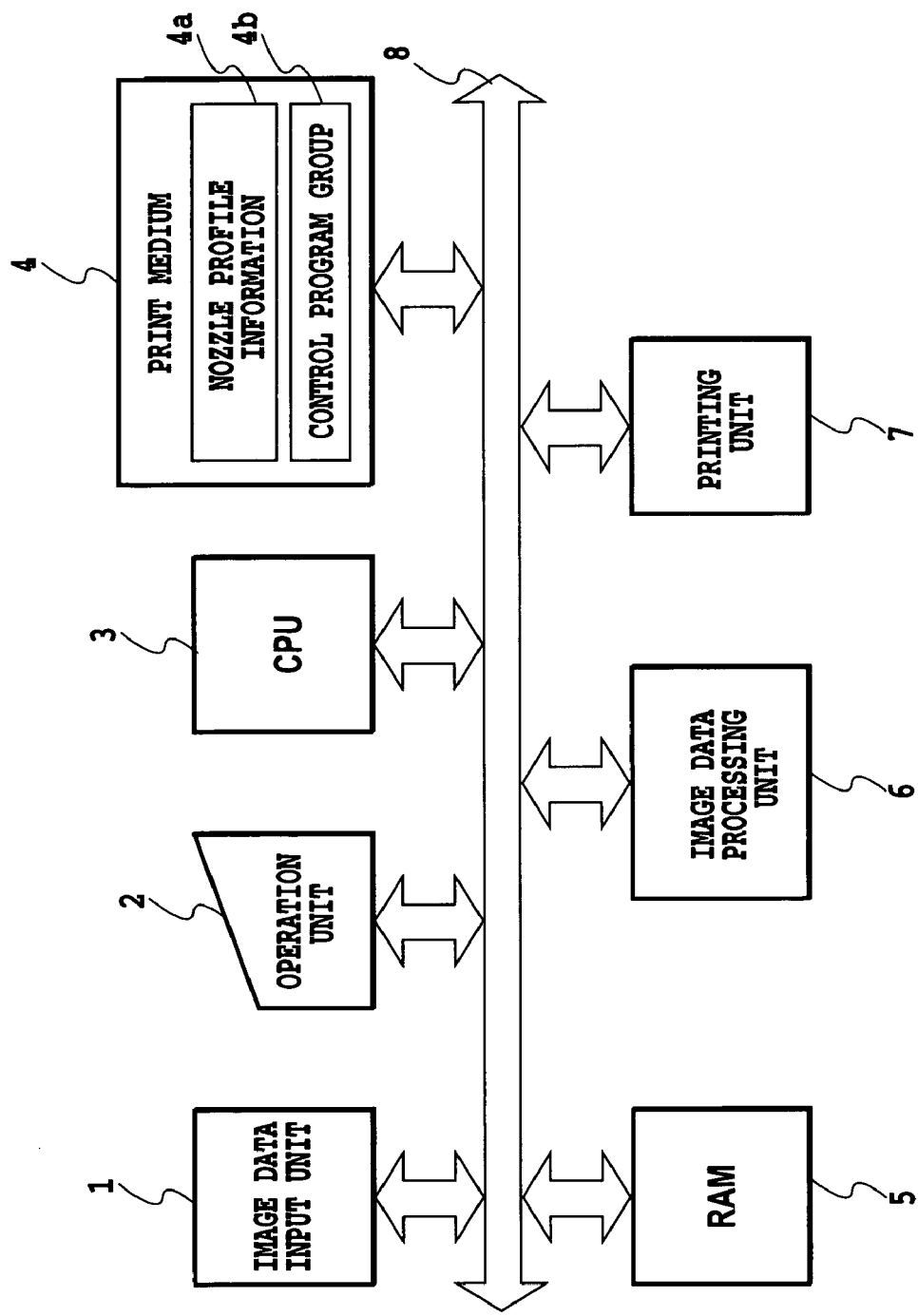
FIG. 3 is a block diagram showing an example configuration of a control system in the embodiment of this invention.

FIG. 3 is a block diagram showing an example configuration of a control system of an ink jet printing apparatus used in embodiments of the present invention.

In FIG. 3, reference number 1 represents an image data input unit for inputting multivalued image data from an image input device, such as scanner and digital camera, and multivalued image data stored, for example, in a hard disk of a personal computer; 2 represents an operation unit having various keys for setting a variety of parameters and for starting a printing operation; and 3 represents a CPU as a control means for controlling various calculation operations and control actions described later that are executed according to programs in a storage medium.

Designated 4 is a storage media which stores a control program group 4b including a control program for controlling the printing apparatus and an error processing program, and nozzle profile information 4a. The printing operations in this embodiment are executed by these programs. The storage media 4 storing these programs may use a ROM, FD, CD-ROM, HD, memory card, and magnetooptical disk. Denoted 5 is a RAM that is used as a work area for the programs in the storage media 4, a temporary save area for error processing, and a work area for image processing. The RAM 5 can also be used in the following manner. After a variety of tables are copied from the storage media 4 into the RAM 5, the content of the tables may be changed and the image processing may be performed by referring to the modified tables.

Denoted 6 is an image data processing unit which quantizes the input multivalued image data into N-value image data for each pixel and generates ejection pattern data based on quantized grayscale value "T" at each pixel. For example, when multivalued image data represented by 8 bits (256 grayscale levels) is entered into the image data input unit 1, the image data processing unit 6 needs to convert the grayscale value of the image data into 25(=24+1)-value data. While the processing to transform the input grayscale image data into T-value data uses a multivalued error-spreading method, the T-value data generation processing may employ any desired half-tone processing method such as an average density storing method and a dither matrix method. Further, repeating the T-value data generation processing according to the image density information for all pixels can generate binary drive signals that cause individual nozzles to eject or not eject at each pixel. A noise information generation means, an estimation means and a correction information generation means are formed mainly by the image data processing unit 6 and the CPU 3. Further, it is also possible to perform control by a printer driver used by a PC.

Denoted 7 is a printing unit which comprises an ink cartridge 22 and a carriage 20 and ejects ink according to an ejection pattern generated by the image data processing unit 6 to form a dot image on a print medium. Designated 8 is a busline in the printing apparatus for transmitting address signals, data, control signals and others.

Next, by referring to FIG. 4 to FIG. 11, we will describe a process of generating nozzle information for print heads, which constitutes one of features of this embodiment, a process of generating print information for each nozzle based on the nozzle information, and an actual printing operation.

In generating print information, it is checked whether there are any nozzles in print heads whose ink landing positions deviate from a desired print matrix. If any such nozzles exist, it is necessary to determine nozzle information, which includes positions of such nozzles, degrees to which landing positions of ink droplets ejected from these nozzles deviate from the print matrix and, depending on circumstances, sizes of landing ink droplets and shapes of ink dots formed.

Figure 4A:
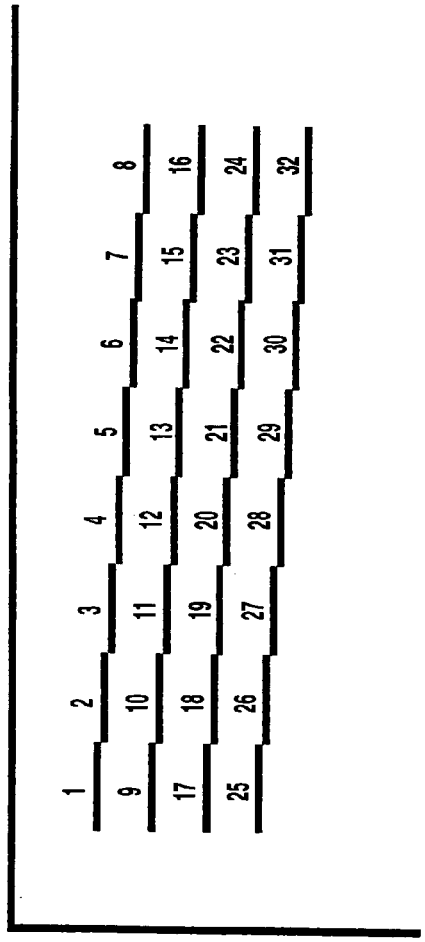
FIG. 4A is an example step chart for identifying faulty nozzles in a print head, formed by a print head having normal nozzles.
Figure 4B:
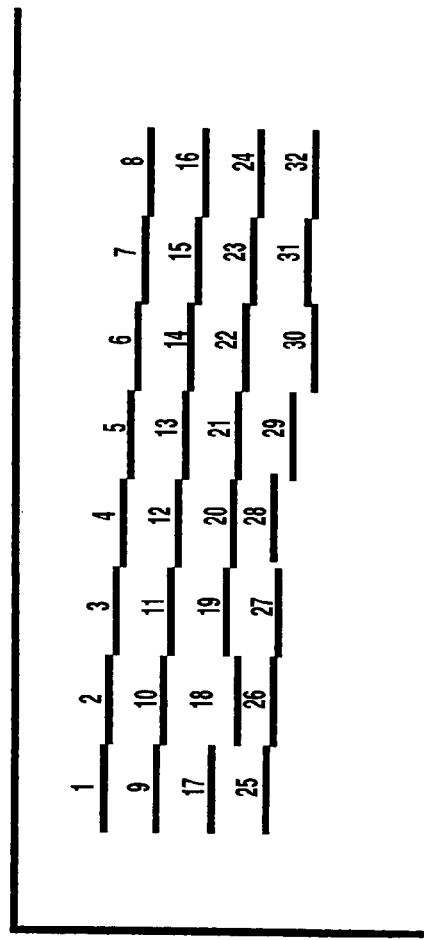
FIG. 4B is an example step chart for identifying faulty nozzles in a print head, formed by a print head having faulty nozzles at 18th, 28th and 30th positions.

For this purpose, a test pattern (step pattern) such as shown in FIG. 4 is printed using an apparatus of FIG. 1. The step pattern consists of short printed line segments, eight segments from eight nozzles in each row, formed by causing each nozzle to eject color dots continuously or non-continuously over a short distance. This test pattern printing is performed for a required number of nozzles. This step pattern indicates by how much distance the ink dots formed deviate in a vertical direction in the figure from the ideal print matrix MT. More specifically, the printed test pattern (or step chart) is scanned by a sensor not shown to measure by how many micrometers the line segments deviate from their ideal landing positions. The measured deviations are used as nozzle profile information. Rather than using the sensor, it is also possible to visually determine deviated positions and amounts of deviation to generate nozzle profile information and input this information into the printing apparatus. This nozzle information is prepared for each print head.

Dot position deviations can be determined as follows. An ideal step chart as a reference is generated in advance using a general printing method or a silver salt picture. Then, a step chart is test-printed on the reference step chart to measure deviations from the ideal print matrix. Alternatively, the printed step chart may be read by a scanner not shown and checked against the ideal print matrix by considering the nozzle positions to calculate deviations.

Figure 5A:
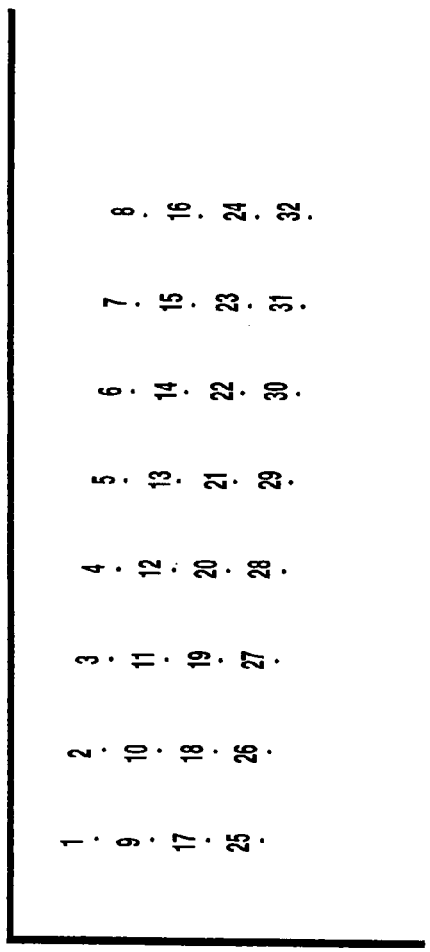
FIG. 5A is an example dot chart for identifying faulty nozzles in a print head, formed by a print head having normal nozzles.
Figure 5B:
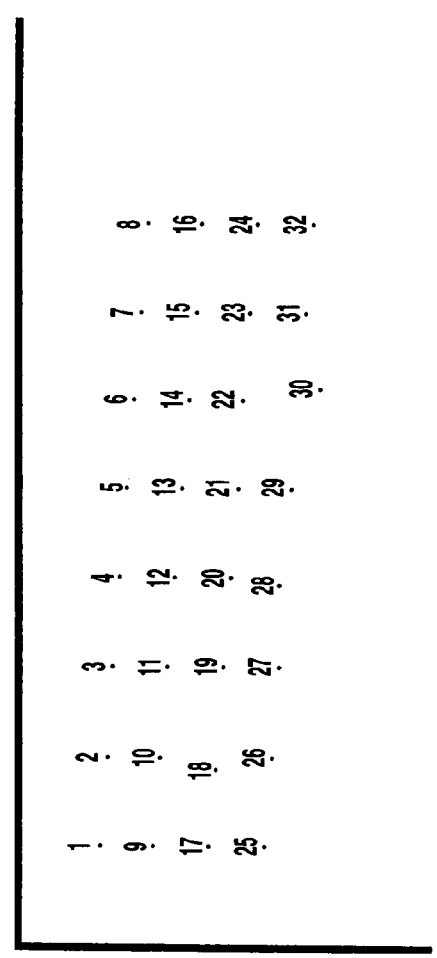
FIG. 5B is an example dot chart for identifying faulty nozzles in a print head, formed by a print head having faulty nozzles at 18th, 28th and 30th positions.

As a further nozzle profile information generation method, it is also possible to print a dot chart, as shown in FIG. 5, consisting of independent ink dots from individual nozzles formed on a print medium and to read, by the method described above, deviations from the ideal print matrix in X and Y directions and diameters and shapes of ink dots.

An image print signal can be generated by a method commonly used in ordinary ink jet printing apparatus. In this embodiment, an input image is color-separated into images of three primary colors, such as C, M and Y, that match the ink colors of print heads. Then, the color-separated images are binarized by an error spreading method.

Next, we will explain about a method of generating head correction (HC) data based on a nozzle profile and a method of generating print data to control ejection/non-ejection operations of nozzles in print heads by performing conversion processing on an image to be printed.

FIG. 7 shows a basic concept of this embodiment. That is, FIG. 7 illustrates an ideal print matrix MT and a state of ink dots that have landed ideally on the ideal print matrix MT. The ideal print matrix MT refers to a virtual matrix set on a print medium. When a solid image is formed by arranging ink dots of a certain shape in matrix on a print medium, minimum unit print areas that match individual dots in one-to-one correspondence are unit matrices MT1. The unit matrices are also referred to as pixels. For the sake of simplification, the ideal print matrix MT of this embodiment comprises square unit matrices MT1 arranged in the main scan direction (in the figure, horizontal direction) and in the subscan direction (in the figure, vertical direction), as shown in FIG. 7. Depending on a resolution of an image and a print density, the arrangement of the unit matrices MT1 may be other than that shown in FIG. 7. The unit matrices MT1 may have other shapes than square. For example, rectangular unit matrices may be arranged in the main scan direction at two times the pitch of the subscan direction.

When ink is landed on the ideal print matrix MT, ink droplets land on a print medium normally as almost circular dots. It is therefore assumed that ink dots that have landed ideally have a shape of perfect circle, and a diameter of perfect circle is set equal to a diagonal length of a unit matrix MT1.

Figure 7A:
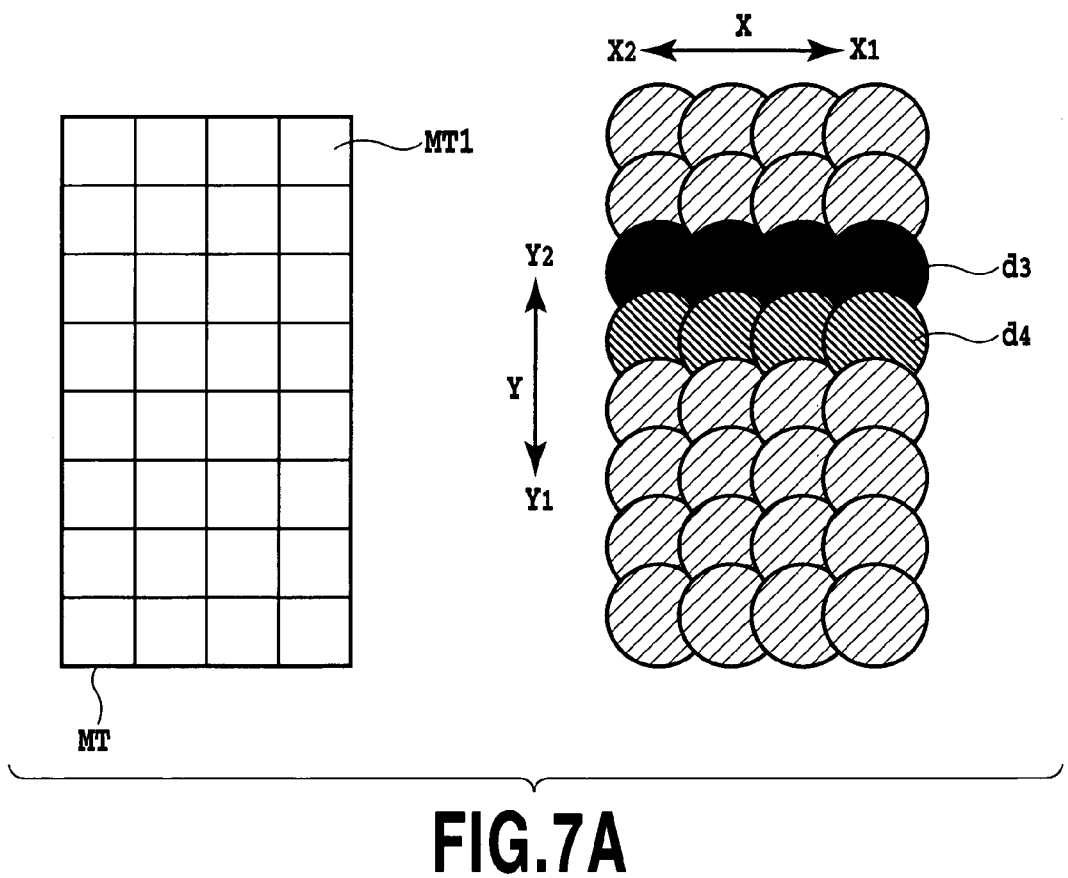
FIG. 7A is a schematic diagram showing an ideal matrix applied to the embodiment of this invention and ink droplets that have landed on the ideal matrix on a print medium in an ideal manner.

A state of ideally landed ink dots is shown in FIG. 7A. The dots shown here schematically represent a state of a solid image that was printed by ejecting ink droplets from all of eight nozzles arrayed in a vertical direction in a print head not shown while moving the print head in the main scan direction X. FIG. 7A illustrates a state of ink dots formed by ink droplets landing ideally on a print medium, and FIG. 7B illustrates a state of ink dots formed by ink droplets failing to land ideally on the print medium.

In the state of FIG. 7A, ink droplets ejected from the nozzles of the print head have landed correctly on the individual unit matrices MT1 in the ideal print matrix MT without a deviation. Therefore, an arrangement of dots in the vertical direction (Y) coincides with a vertical arrangement of nozzles in the print head. For example, third dots d3 from the top in the figure are dots ejected from a third nozzle from the top of the nozzle group of the print head; and fourth dots d4 from the top are dots ejected from a fourth nozzle from the top of the nozzle group.

Figure 7B:
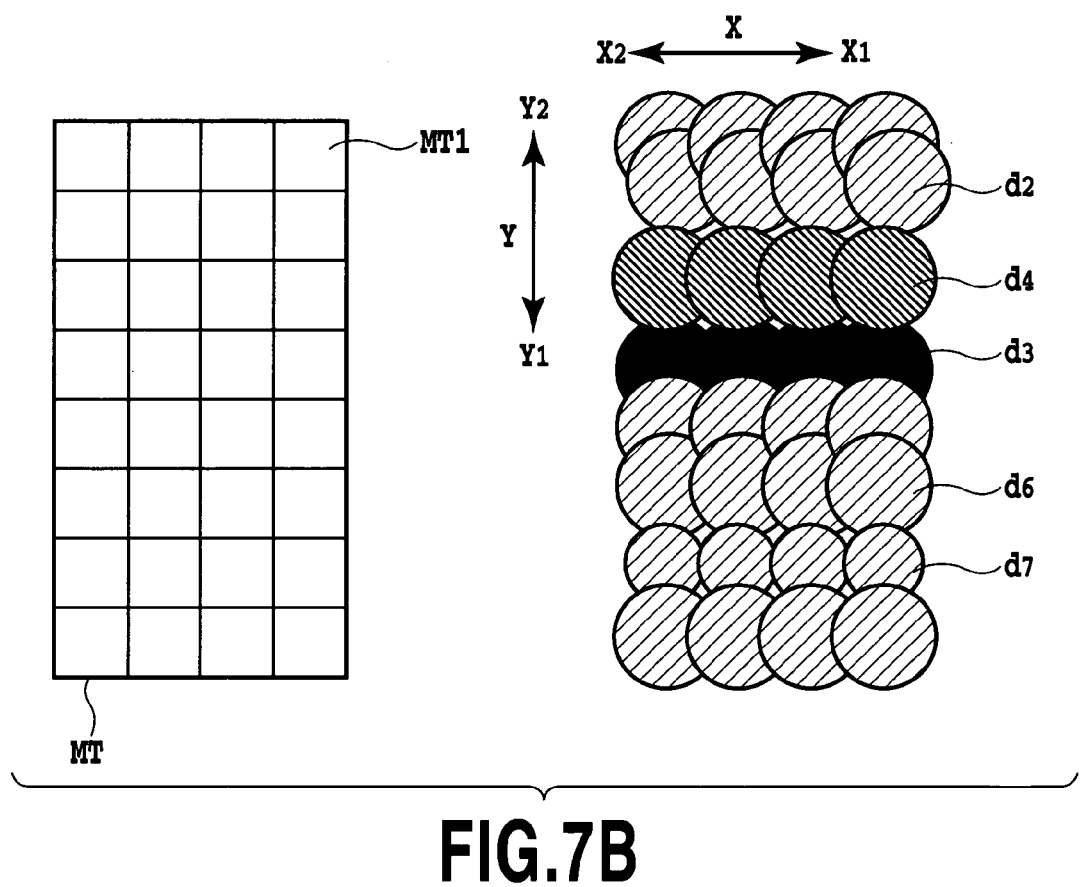
FIG. 7B is a schematic diagram showing an ideal matrix applied to the embodiment of this invention and ink droplets that have landed on the ideal matrix on a print medium not in an ideal manner.

In contrast to the above, an example state of ink dots formed when ink droplets from the print head fail to land on a print medium ideally is shown in FIG. 7B.

In the figure, dots d2 formed by ink droplets ejected from a second nozzle are shifted from their ideal positions in X1 and Y2 directions (toward upper right). Dots d3 formed by ink droplets ejected from a third nozzle are shifted in a Y1 direction and land almost on unit matrices where ink droplets ejected from the fourth nozzle should have landed.

Further, dots d4 formed by ink droplets ejected from a fourth nozzle are shifted in a Y2 direction and land on unit matrices where ink droplets ejected from the third nozzle should have landed.

Dots d6 formed on a print medium by a sixth nozzle have a larger diameter because their ink volumes are larger than those from other nozzles.

Further, dots d7 formed by ink droplets ejected from a seventh nozzle have a smaller diameter because their ink volumes are smaller than those from other nozzles or because ejected ink droplets are split.

Figure 6:
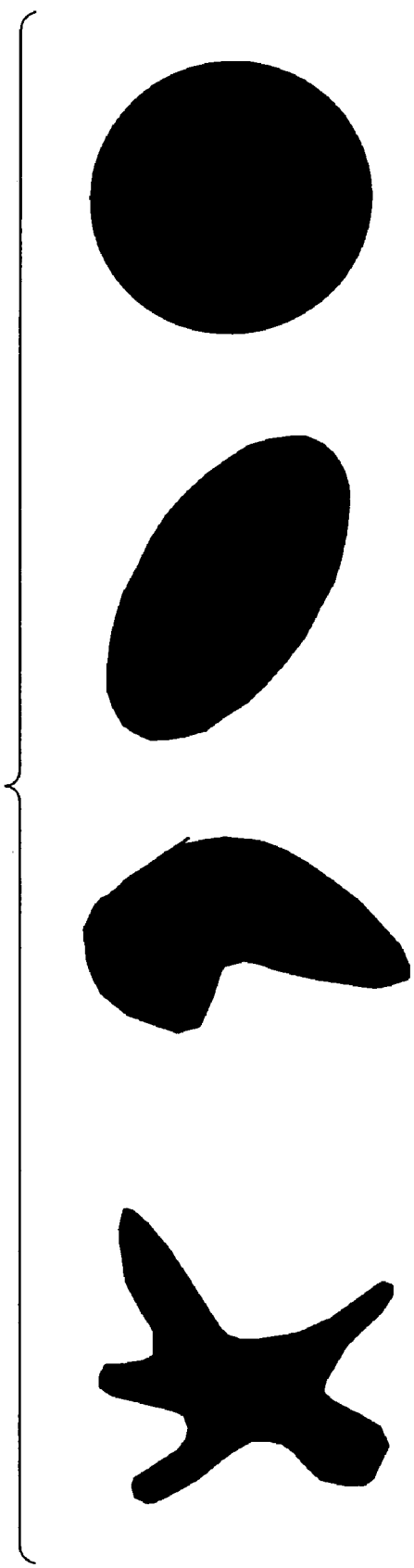
FIG. 6 illustrates a variety of shapes of ink dots formed on a print medium by ink droplets ejected from nozzles of a print head.

Although the ink dots are shown as true circles in FIG. 7, they may not be formed into perfect circles depending on a kind of print medium and a status change of ink that occurs from ejection to landing. As shown in FIG. 6, ink dots may take a variety of shapes on a print medium other than perfect circles. For example, variations in ink ejection volume among nozzles will result in variations in dot size, and as ink droplets that have landed on a print medium are absorbed and fixed in paper surface, ink penetrates into fibers of paper, forming complex shapes of dots as shown. Further, when ink droplets fail to land vertically on a print medium or are applied a moment as by wind, the dots may form into an oval shape or may be broken into fragments.

To describe in more detail, in a process ranging from an ink ejection from print head nozzles to a dot landing on a print medium, ink droplets landing positions sometimes deviate from an ideal landing positions. The ejected ink droplets may not fly in an intended direction or may encounter resistance as they fly. Even after landing on a print medium, ink droplets are affected by an uneven surface of the print medium and their abilities to soak and fix in the print medium. Because of these uncontrollable factors, forming dots of a perfectly uniform shape at appropriate positions is difficult to achieve. That is, it is extremely difficult to form ideal dots such as shown in FIG. 7A.

To deal with this difficulty, it is conventional practice to perform correction processing such as head shading. An idea behind the conventional head shading is as follows. Since positions on a print medium printed by a nozzle with a large ink ejection volume have a high density and positions printed by a nozzle with a small ink ejection volume have a low density, a chart of a predetermined density is printed on a print medium and actual densities of the printed chart are measured and matched against the corresponding nozzle positions. Then corrections are made to lower the density at portions where the measured image density is higher than normal and to increase the density at portions where the measured image density is lower than normal. This density adjustment to improve an image quality is achieved by modifying a drive control for each nozzle, i.e, by shortening a drive pulse for nozzles whose ejection volumes are large and raising a drive voltage for nozzles whose ejection volumes are small.

With this head shading correction, however, there are cases where corrections cannot be made and desired effects are not obtained. For example, when ink droplets ejected from the third nozzle and the ink droplets ejected from the fourth nozzle cross each other and land as shown in FIG. 7B, a desired effect from the correction may not be produced. That is, when the density of the third unit matrices is high, this problem is traced to an improper ejection volume of the fourth nozzle. In this case, if the head shading processing is performed by matching read image densities against nozzle positions and reducing the ejection volume of the third nozzle, as described above, it is understood that the correction of the ejection volume does not work well for the correction of image density variations because the ink dots d3 ejected from the third nozzle land on fourth unit matrices.

In another example, when dot landing positions deviate from an ideal print matrix in X and Y directions, the deviated dots increase the density of an adjoining matrix line and decrease the density of an intended matrix line. In this case, performing the conventional head shading results in a correction that increases the density of the adjoining matrix line associated with the deviated nozzle because the head shading does not take the landing position deviations into account. As a result, the density of the adjoining matrix line is further increased, rendering an accurate correction impossible.

The present invention is intended to eliminate problems that could not be solved by the conventional method and to enable more precise corrections. With this invention, there is a situation in which a correction opposite to that of the conventional method is performed. For example, if a nozzle assigned to an N-th raster printing is given correction data that is suited when the ejection volume of this nozzle is small, this invention may perform a correction on an image input signal to make it still smaller based on estimation-calculated correction data. This is explained as follows. When nozzles adjoining the N-th raster nozzle have deviations in the ink ejection direction and dots formed by these adjoining nozzles overrun their own print areas into the print area of the N-th raster, the N-th raster image density may increase, affected by the overrunning portions of the adjoining raster dots. In this case, if the nozzle that prints on the N-th raster has a small ejection volume, a correction is made in such a manner as will further reduce the density to minimize visible bands or density variations in a printed image. That is, while the conventional correction causes nozzles with small ejection volumes to perform a higher density printing than an input image signal, the present invention may perform a correction totally different from that of the conventional method. With this characteristic correction this invention minimizes visible bands or density variations.

The problem of visible bands or density variations have conventionally been dealt with as by averaging high and low density values of nearby matrix lines or by reading nearby image areas in addition to reading a target image area. In the ink jet printing apparatus currently under pressure to meet an ever-increasing demand for higher image quality, a more precise correction technique is being called for.

Figure 8:
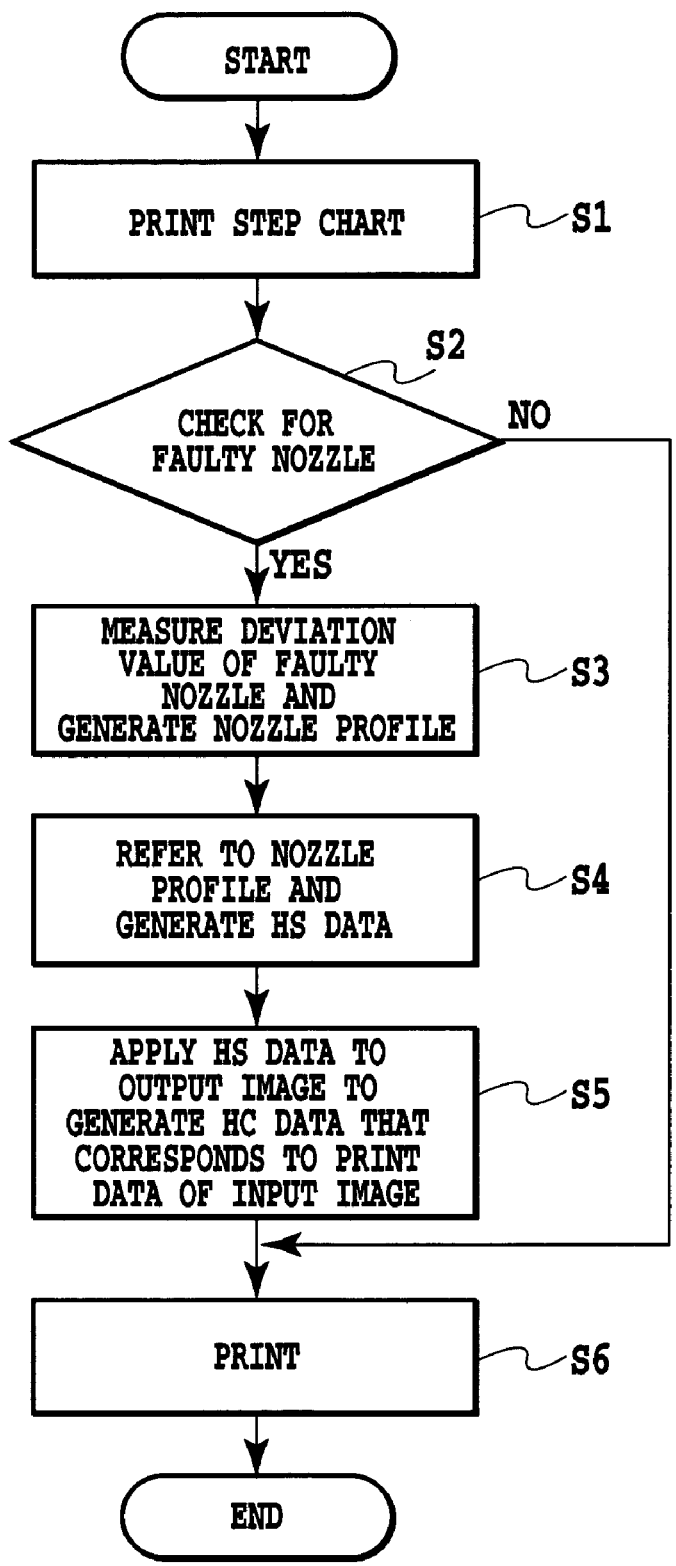
FIG. 8 is a flow chart showing an example control operation in a first embodiment of the invention.

To meet this requirement, the first embodiment of this invention performs processing such as shown in a flow chart of FIG. 8.

First, at step S1, step charts such as shown in FIG. 4 are printed so that the state of ink droplets from individual nozzles that have landed on a print medium can be observed. Next, the printed charts are read by an optical sensor not shown (step S2) and, based on the data thus read, deviations of the landing positions from an ideal print matrix are measured. This measurement may be made visually. After the dot chart of FIG. 5 is printed, the size and shape of dots that have landed on a print medium may be measured using an optical sensor not shown to determine the ejection volume of each ink droplet.

If this measurement finds that some dots are not on the ideal print matrix, that some dots have diameters different from an ideal dot diameter, or that some dots have shapes different from an ideal dot shape, the nozzles that formed these dots are determined as faulty nozzles. Alternatively, without making a check for faulty nozzles, it is possible to execute a step for automatically generating nozzle profile information for all nozzles.

If no faulty nozzles are detected, the processing moves to step S6 where a desired image is printed without performing correction processing.

If at step S2 a faulty nozzle is found, nozzle profile information described later is generated for each of the nozzles making up a print head. In this embodiment a Y deviation value is used as an important parameter of the nozzle profile information. Let a direction of column of nozzles making up the print head (subscan direction) be a Y direction and a main scan direction in which the print head is moved relative to a print medium be an X direction. Then, the Y deviation value means an amount of deviation in the Y direction between a landing position of an ink droplet ejected from a nozzle (center position of a dot) and a center position of the corresponding unit matrix (ideal lattice point) of the ideal print matrix MT. Thus, suppose that, in performing a one-scan (1-pass) printing, a nozzle pitch is set equal to the size of unit matrices of ideal landing matrix or to 1,200 dpi (about 20 µm). If the landing position of an ink droplet ejected from an m-th nozzle is deviated by about half a pixel toward (m−1)st or (m+1)st nozzle, then the Y deviation value will be +10 µm or −10 µm and this value is stored as the nozzle profile information. At the same time, whether or not a diameter of this ink dot (which is determined, for example, by the ejection volume) is larger than an ideal ink dot diameter is also managed as the nozzle profile information.

Returning to FIG. 8, the operation that follows step S2 will be explained. As described above, the Y deviation values of faulty nozzles are measured at step S3 and, based on the measured values, nozzle profile information is generated (step S3). Next, by referring to the nozzle profile information, HS data is generated (step S4). Based on the HS data, HC data (Head Correction Table) that corresponds to the size of input image print data is generated (step S5). Then, using the generated HC data, the print data of an input image is transformed and a printing operation is executed according to the transformed print data (step S6).

Now, a generation of a variety of information, performed in and after step S4, will be explained in detail by referring to FIG. 9 to FIG. 11.

Figure 9A:
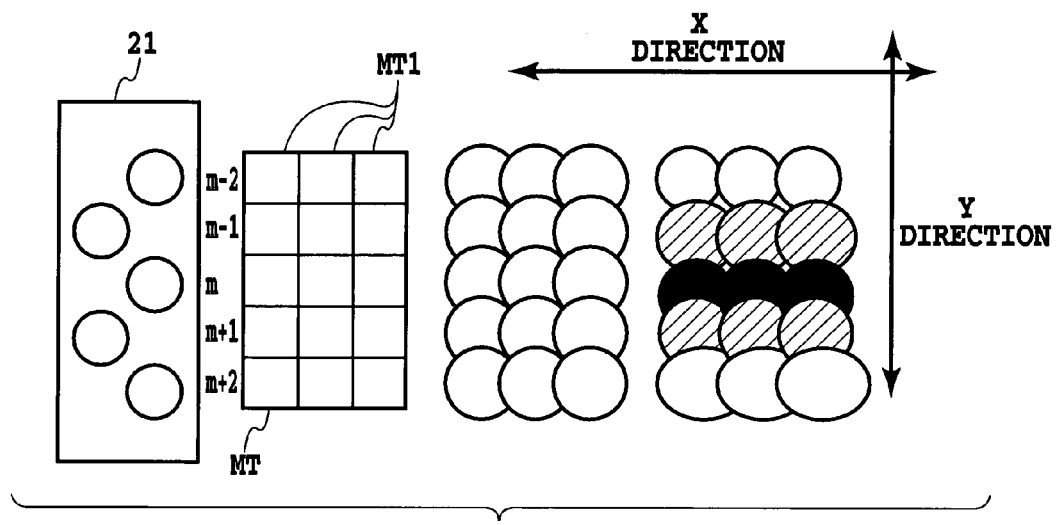
FIG. 9A is an explanatory diagram showing how a plurality of ink dots formed by ink droplets ejected from nozzles affect one of ideal matrix lines in the first embodiment, and also illustrating a print head, an ideal matrix, ink droplets that landed in an ideal manner, and ink droplets that failed to land in an ideal manner.
Figure 9B:
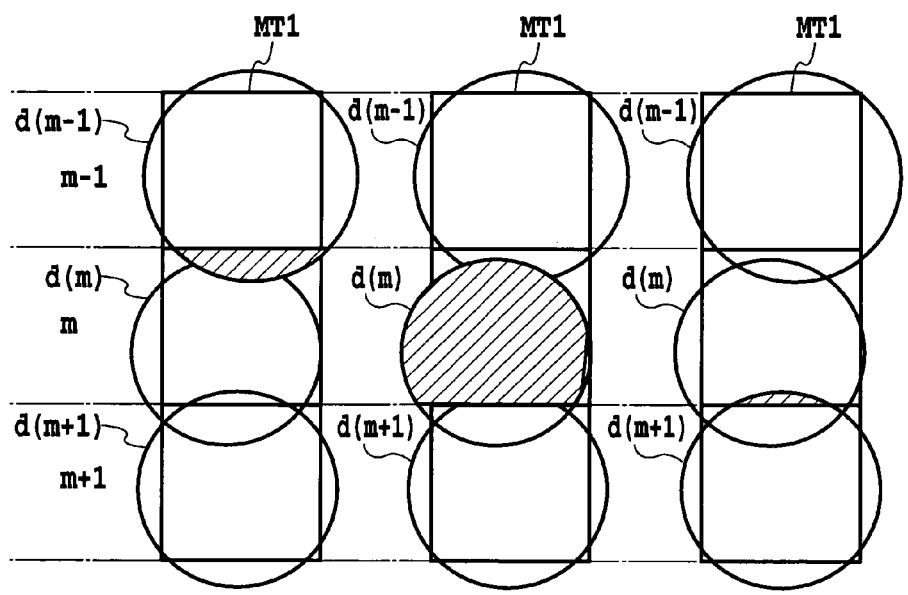
FIG. 9B is an explanatory diagram showing how a plurality of ink dots formed by ink droplets ejected from nozzles affects one of ideal matrix lines in the first embodiment, and also illustrating in a magnified state three rows of dots d(m−1), d(m), d(m+1) at a center of the dot group of FIG. 9A.

FIG. 9A schematically illustrates, from left to right, a print head 21, an ideal print matrix MT, a state of ink dots that landed ideally on the ideal print matrix MT, and a state of ink dots that failed to land ideally on the ideal print matrix MT. For simplicity of explanation, the print head 21 is shown to have only five nozzles. FIG. 9B is an enlarged view showing details of three ink dot rows in the center of the dot group of FIG. 9A.

Data generation is performed by identifying those nozzles which ejected ink dots covering at least a part of a particular matrix line of the ideal print matrix MT as determinant nozzles that affect a density of that matrix line and by determining a percentage of that portion of each ink dot from the determinant nozzles which affects the density of that particular matrix line.

For example, let us consider a case in which ink droplets ejected from (m−1)st, m-th and (m+1)st nozzles form dots d(m−1), d(m), d(m+1), as shown in FIG. 9B. How these dots affect the density of an m-th matrix line is determined, as follows. A portion of the ink dot d(m−1) formed by the (m−1)st nozzle that overlies the m-th matrix line and affects the density of that line (a hatched portion in a left nozzle column in FIG. 9B) is 10% of an ideal dot. A portion of the ink dot d(m) ejected from the m-th nozzle which affects the m-th matrix line (in FIG. 9B, a hatched portion in a center nozzle column) is 80% of an ideal dot. A portion of the ink dot d(m+1) ejected from the (m+1)st nozzle which affects the m-th matrix line (in FIG. 9B, a hatched portion in a right nozzle column) is 5% of an ideal dot. This dot landing state is equal in printed density to 95% of an ideal dot landing state.

Figure 10:
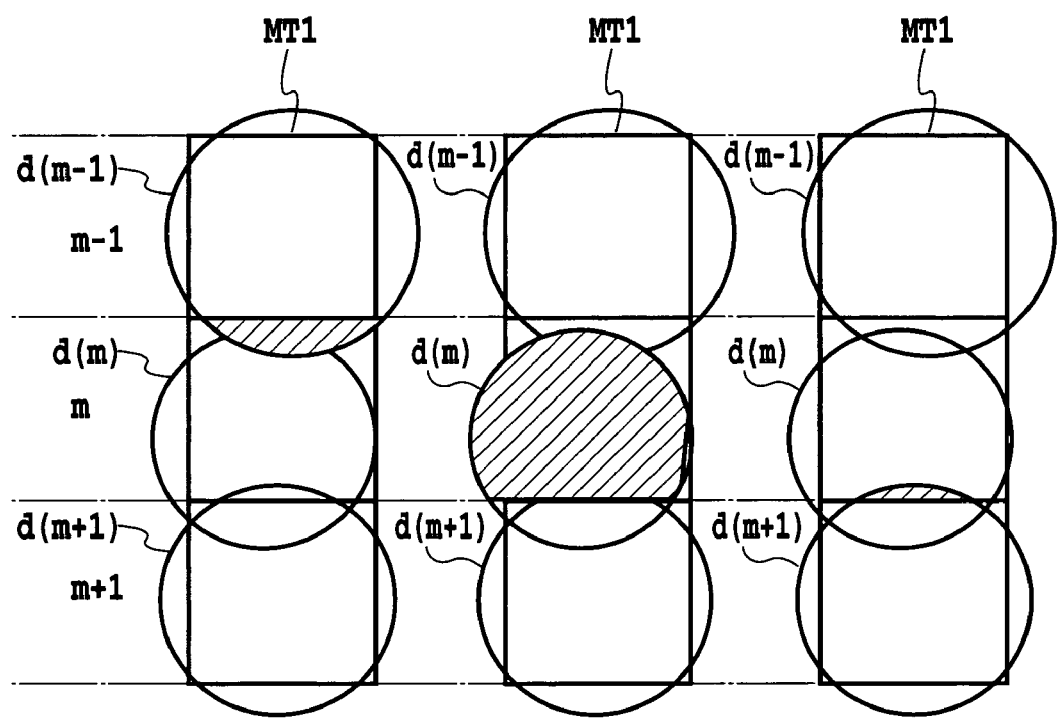
FIG. 10 is an explanatory diagram showing how ink dots formed by ink droplets ejected from nozzles affect one unit matrix in the first embodiment, and also illustrating in a magnified state three rows of dots d(m−1), d(m), d(m+1) at a center of the dot group of FIG. 9A.

While we have focused our attention on a particular line on the print matrix in this case, it is possible to determine a percentage of an affecting portion of each adjoining dot for each target unit matrix MT1, as shown in FIG. 10.

The percentage of dot portions affecting the density of a particular matrix line (degree of influence) can be determined as follows by referring to nozzle profile information, particularly Y deviation values in the Information.

Figure 11A:
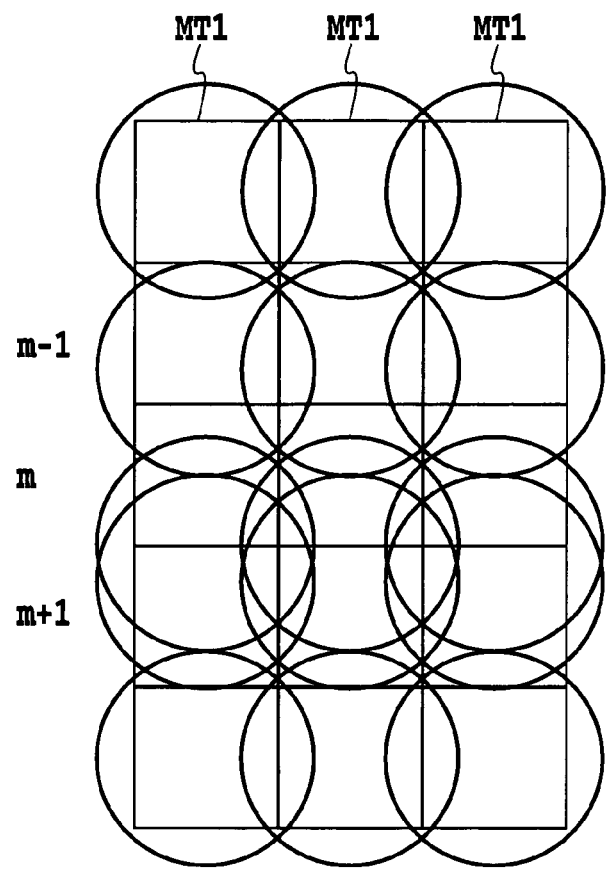
FIG. 11A is an explanatory diagram showing a plurality of ink dots ejected from nozzles that are deviated from their intended positions in the first embodiment.

Suppose, for example, that a nozzle pitch (equivalent to the unit print matrix size) is 20 µm (equivalent to 1,200 dpi) and that every nozzle forms an ink dot 30 µm in diameter on a print medium. It is also assumed that a direction from (m−1)st line to (m)th line is taken as a positive direction and that a Y deviation value of a dot from the (m−1)th nozzle is +5 µm, a Y deviation value of a dot from the (m)th nozzle is +10 µm, and a Y deviation value of a dot from the (m+1)th nozzle is −5 µm. As shown in FIG. 11A, the density of the m-th matrix line is determined from the following formulas based on the dots from (m−1)st nozzle, (m)th nozzle and (m+1)st nozzle.

Figure 11B:
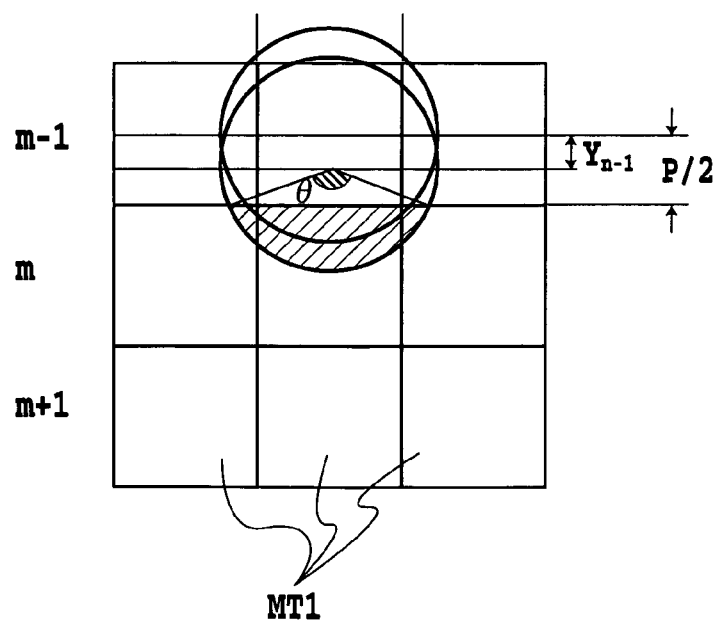
FIG. 11B is an explanatory diagram showing a method of calculating a degree to which a plurality of ink dots affects one of ideal matrix lines.

As shown in FIG. 11B, let a dot radius be R, a dot area be S, a Y deviation value be Y and a width of a print matrix line be P. Then, a percentage (degree of influence) of that portion of dot d(m−1) affecting the density of the m-th matrix line, $Z_{m-1}(L)$ (L is a number representing a matrix line position), is determined by $$Z_{m-1}(L) = R^2 \times \cos\theta^{-1}((P/2-Y_{n-1})/R) - (P/2-Y_{n-1}) \times \sqrt{(R^2 + (P/2-Y_{n-1})^2)}$$

A degree of influence of that portion of dot d(m+1) affecting the m-th matrix line, $Z_{m+1}(L)$, can also be determined in the similar manner.

The center angle θ is an angle formed by two line segments (radii) connecting a dot center and two intersecting points between the dot and the m-th matrix line.

Further, a degree of influence of that portion of dot d(m) affecting the m-th matrix line, $Z_m(L)$, can be obtained from the following equation.

$$Z_m(L)=100-Z_m(L-1)-Z_m(L+1) \ (\%)$$

If different nozzles have different dot radii, the degree of influence can be calculated by substituting individual radius values.

Further, if the dot shape is not a true circle, the degree of influence can also be determined in the similar manner though the calculation becomes complicated. In that case, a complex shape may be approximated to a predetermined simple shape that allows for simpler calculation.

By analyzing a printed state of a particular matrix line (L), particularly nozzles that affect a density of that matrix line, the density of the matrix line can be estimated.

That is, if $D_1$ stands for a density produced by an ideal printed dot and DL for an estimated density of line L, the estimated density $D_L$ is expressed by the following equation, which sums up degrees of influence Z(L) of (m−a)th to (m+b)th nozzles (a and b are positive integers).

$$D_L=k_{den}(Z_{m-a}(L) \ldots Z_{m-1}(L)+Z_m(L)+Z_{m+1}(L) \ldots Z_{m+b}(L))$$

$k_{den}$ is a coefficient used to determine an actual density from a dot area and can be calculated by measuring a density of a printed image.

A coefficient $H_{conf}$ for head correction is given by $$H_{conf}(L)=k_{head} \times D_L/D_i$$

This gives a measure of how the printed matrix contributes to an actual density on a print medium.

$k_{head}$ is a coefficient to finely adjust a coefficient K, and varies depending on a print medium used and a printing environment and can be determined experimentally.

The $H_{conf}$ is used to correct an image to be printed and to control a drive signal for the ejection operation of each nozzle to change an ejection volume during the head shading processing.

As described above, in a printing process, if ink dots intended for other matrix lines land overlapping a matrix line of interest, the above embodiment considers an effect the dots of other lines have on a density of the matrix line of interest in making printing operation corrections. Hence, even with a 0.5 print head having nozzles that eject ink droplets with deviations in the Y direction, a satisfactory correction effect can be produced, thereby forming high quality images.

Although in the above embodiment a nozzle correction coefficient is calculated for each matrix line L, it is possible to use degrees of influence on a particular matrix line L from adjoining matrix lines, $Z_{m-1}(L)$, $Z_m(L)$, $Z_{m+1}(L)$, in calculating a correction coefficient for an (m−1)st nozzle that prints on a matrix line L−1 adjacent to the matrix line L. More specifically, a coefficient $H_{nozz}$ for head correction is calculated as follows. In the processing for a matrix line L, a head correction is performed also on the (m−1)st nozzle that is intended to print on the matrix line L−1. That is, corrections are performed on the nozzles that affect the density of the matrix line L and/or on an image printed by these nozzles.

If a matrix line L printed by a nozzle m is affected by ink dots formed by nozzles that print on matrix lines L−1, L, L+1, the coefficient $H_{nozz}$ for head correction is given by $$H_{nozz}(L)=Z_m(L-1) \times H_{conf}(L-1)+Z_m(L) \times H_{conf}(L)+Z_m(L+1) \times H_{conf}(L+1))$$

Though not shown in the above equation, any desired coefficient may be applied to each term as needed. The above equation means that the correction coefficient for the nozzle m that prints on the matrix line L also takes into account an estimated print density correction for the matrix lines (in the above equation, L−1 and L+1) which are affected by ink dots formed by the nozzle m.

In other words, based on the degrees to which ink dots ejected from the nozzle m affect the matrix lines L−1 and L+1, i.e., the states of these matrix lines L−1, L, L+1, the head correction data is calculated.

With the method described above, even if ink dots are greatly deviated from an intended matrix line toward an adjoining matrix line, a matrix line correction can be realized by correcting image data for the nozzles that affect the matrix line of interest and/or by correcting ejection volumes of these nozzles. In this way an excellent correction function can be obtained.

[Second, Third and Fourth Embodiment]

In the first embodiment, a Y deviation value of each ink dot is used as an important parameter in setting nozzle profile information. The present invention can also use other values in addition to the Y deviation value as the parameter.

Figure 12:
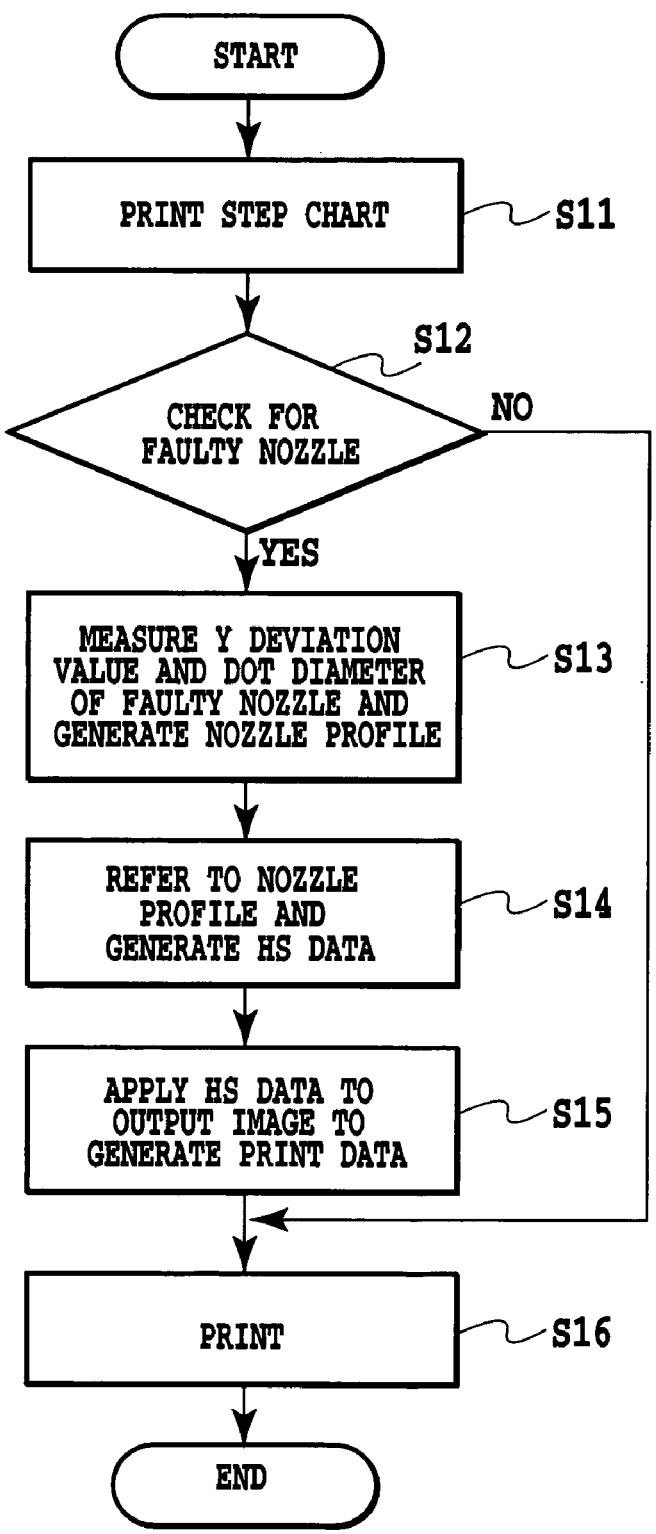
FIG. 12 is a flow chart showing a control operation in a second embodiment of the invention.

For example, in a second embodiment of this invention shown in FIG. 12, a dot diameter in addition to the Y deviation value of a faulty nozzle is used as the parameter, as shown at step S13. Further, in a third embodiment of the present invention shown in FIG. 13, an X deviation value in addition to the Y deviation value and dot diameter is used as the parameter, as shown at step S23. Further, in a fourth embodiment of the present invention shown in FIG. 14, a dot shape in addition to the Y deviation value, dot diameter and X deviation value is used as the parameter, as shown at step S33.

Figure 13:
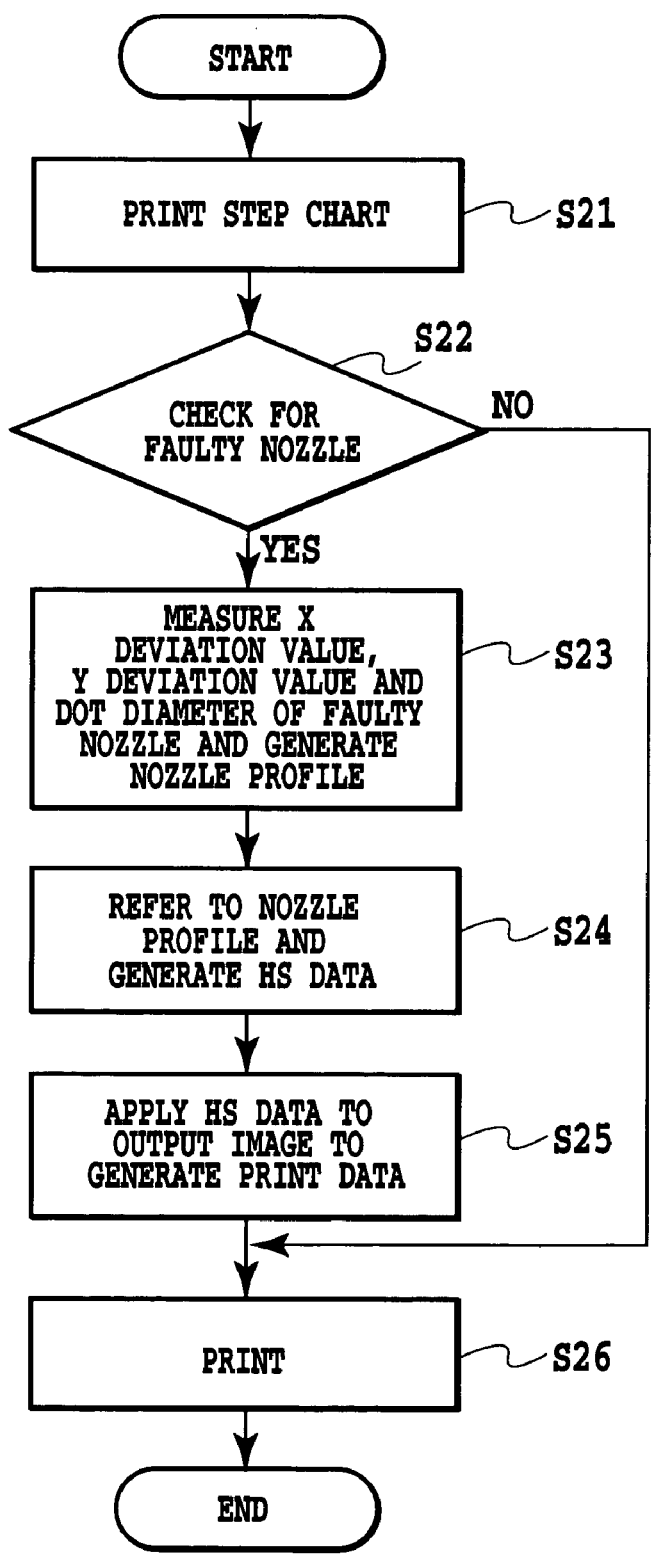
FIG. 13 is a flow chart showing a control operation in a third embodiment of the invention.
Figure 14:
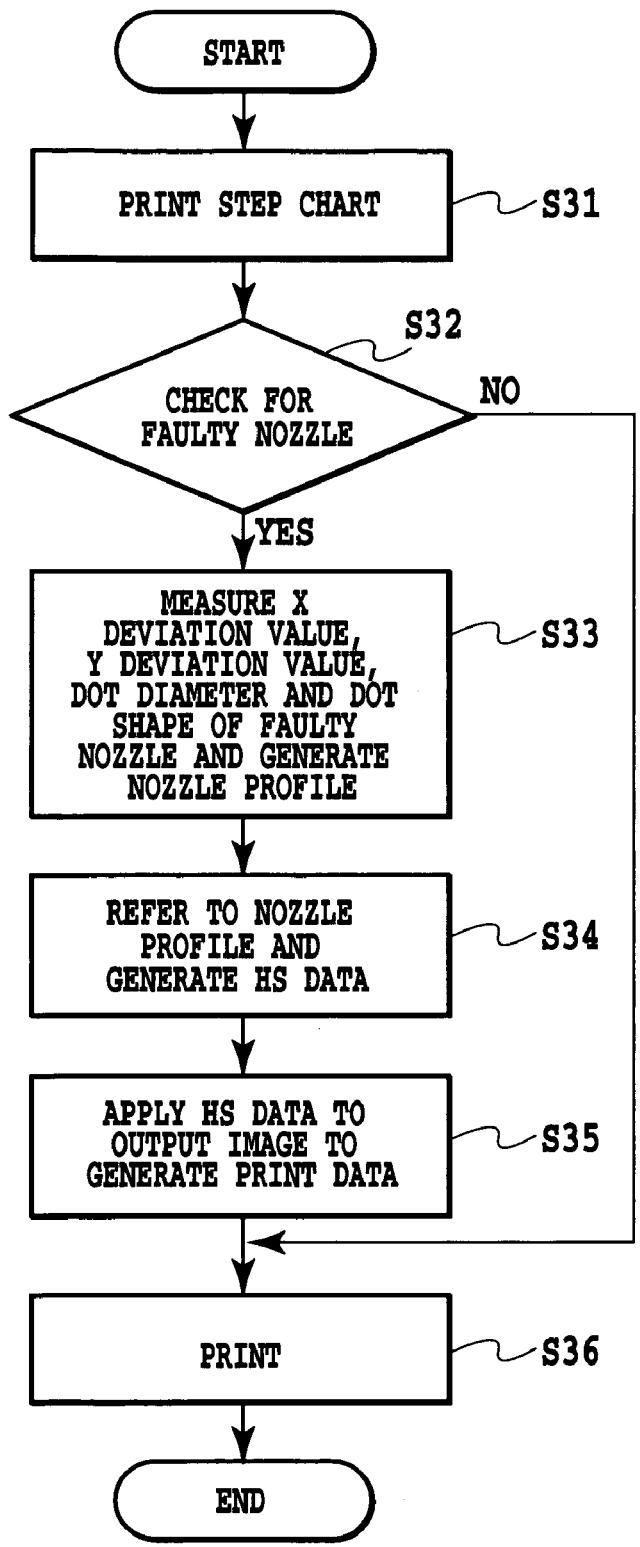
FIG. 14 is a flow chart showing a control operation in a fourth embodiment of the invention.

Setting as many parameters as possible, as described in the second to fourth embodiments, can produce more precise nozzle profile information, which in turn provides an image with an excellent tonality and an improved immunity from banding, compared with the first embodiment. In FIG. 12 to FIG. 14, steps other than the above-mentioned steps S13, S23, S33 are almost similar to the steps S1, S2 and S4–S6 that have been described in the first embodiment.

Further, this invention can also be applied without a problem to ink jet printing apparatus that use a plurality of dark and light inks and large and small dots for each ink color. In that case, a highly enhanced image quality can be reproduced on a print medium.

EXAMPLE 1

Next, some examples of printing performed by using the ink jet printing apparatus and the printing method according to the first embodiment of the invention will be explained.

A print head used has a resolution of 1,200 dpi and an array of 4,096 nozzles, with an ink ejection volume (volume of each ink droplet) set to 4.5±0.5 pl.

Inks containing colorants have the following compositions.

| (Prescription: Y ink) | |
| --- | --- |
| Glycerine | 5.0 parts by weight |
| Thiodiglycol | 5.0 parts by weight |
| Urea | 5.0 parts by weight |
| Isopropyl alcohol | 4.0 parts by weight |
| Dystuff, C.I. Direct Yellow 142 | 2.0 parts by weight |
| Water | 79.0 parts by weight |
| (Prescription: M ink) | |
| Glycerine | 5.0 parts by weight |
| Thiodiglycol | 5.0 parts by weight |
| Urea | 5.0 parts by weight |
| Isopropyl alcohol | 4.0 parts by weight |
| Dystuff, C.I. Acid Red 289 | 2.5 parts by weight |
| Water | 78.5 parts by weight |
| (Prescription: C ink) | |
| Glycerine | 5.0 parts by weight |
| Thiodiglycol | 5.0 parts by weight |
| Urea | 5.0 parts by weight |
| Isopropyl alcohol | 4.0 parts by weight |
| Dystuff, C.I. Direct Blue 199 | 2.5 parts by weight |
| Water | 78.5 parts by weight |
| (Prescription: K ink) | |
| Glycerine | 5.0 parts by weight |
| Thiodiglycol | 5.0 parts by weight |
| Urea | 5.0 parts by weight |
| Isopropyl alcohol | 4.0 parts by weight |
| Dystuff, Food Black 2 | 3.0 parts by weight |
| Water | 78.0 parts by weight |

As a print medium, PB•PAPER (Canon make) for electrophotographic picture and ink jet printing was used. Printing operations were performed using these color inks and print medium.

A printing operation was controlled according to a control sequence shown in the flow chart of FIG. 8. First, a step chart of FIG. 4 was output and then read at a resolution of 4,800 dpi by an optical sensor (scanner) not shown. At this time, the chart may be marked to match individual nozzles to their associated printed line segments in their positional relationship. Then, each of the printed line segments was subjected to line-thinning processing to determine a gravity center of an ink dot and measure a Y deviation value of the ink dot from its ideal landing position. This process was done for all nozzles to generate nozzle profiles.

Ink dots ejected from nozzles had a landing precision of 6 μm in σ value and a maximum deviation of +25 μm. Using this nozzle profile, a printed density was estimated for each matrix line from the formulas described earlier and head correction data (HC data) was generated. Then, a density grayscale value in print data of an image to be printed was corrected for each line assigned to the associated nozzle. A plurality of kinds of ink described above were used for printing. As a result, a high-quality image with fewer banding phenomena and no white stripes was obtained.

In contrast to the above, the printing was done by omitting the head correction processing while keeping other conditions similar to those of the above example. This produced a poor-quality image with visible white stripes or bands.

Performing the conventional head shading processing in the printing resulted in an image with reduced density variations but with persisting visible bands. An image quality degradation is obvious when compared with an image produced by the above example method.

Next, a fifth embodiment of the present invention will be explained. In this embodiment, too, the construction shown in FIG. 1 to FIG. 3 is used as in the preceding embodiment.

A generation of print head nozzle information, one of features of this embodiment, a generation of print information for each nozzle based on the nozzle information, and an actual printing operation will be explained by referring mainly to FIG. 15 and FIG. 16.

To generate the print information the following process needs to be taken. First, a check is made to see if there is any among the print head nozzles that projects ink droplets with deviations from an ideal print matrix. If there is such a nozzle, nozzle information needs to be determined which includes an amount of deviation of an ink droplet ejected from that nozzle with respect to the print matrix and, if necessary, a size and shape of an ink dot formed by the nozzle.

To obtain the nozzle information, a first step to be taken is to print a step pattern PT1, such as shown in FIG. 15A, by using a printing apparatus of FIG. 1. The step pattern PT1 consists of short printed line segments, eight segments from eight nozzles in each row, formed by causing each nozzle to eject color dots continuously or non-continuously over a short distance. This pattern printing is performed for a required number of nozzles. This step pattern PT1 indicates by how much distance the ink dots formed deviate in a vertical direction in the figure from the ideal print matrix MT. More specifically, the printed step pattern (or step chart) PT1 is scanned by a sensor (not shown) to measure by how many micrometers the line segments deviate from their ideal landing positions. The measured deviations are used as nozzle profile information. Rather than using the sensor, it is also possible to visually determine deviated positions and amounts of deviation to generate nozzle profile information and input this information into the printing apparatus. This nozzle information is prepared for each print head.

Dot position deviations can be determined as follows. An ideal step chart as a reference is generated in advance using a general printing method or a silver salt picture. Then, a step chart is test-printed on the reference step chart to measure deviations from the ideal print matrix. Alternatively, the printed step chart may be read by a scanner not shown and checked against the ideal print matrix by considering the nozzle positions to calculate deviations.

The test pattern may be printed as a solid pattern formed of solid images. This solid pattern need only have a uniform print density in a predetermined area. The solid pattern may, for example, be a check pattern PT2 as shown in FIG. 15. If the solid pattern PT2 is completed by one printing scan (1-pass printing) using a print head containing faulty nozzles, stripes or bands are formed or density variations become visible, as shown in FIG. 15B. These variations are read by sensor or by sight to generate the nozzle profile information.

Further, a dot chart may be formed by causing all the nozzles to eject ink to form independent ink dots on a print medium, as shown in FIG. 5. Using the method described above, deviations of these ink dots from the ideal print matrix in X and Y directions and diameters and shapes of the dots are read to generate the nozzle profile information.

Image print signals can be generated by a method commonly employed by ordinary ink jet printing apparatus. In this embodiment, an Input image is color-separated into three CMY primary colors for print heads of the corresponding colors and then the color-separated images are binarized by an error spreading method.

Next, we will describe a method of generating head correction (HC) data based on the nozzle profile and a method of performing, based on the HC data, conversion processing on an image to be printed and generating print data that controls an ejection/non-ejection operation of each of print head nozzles.

First, a grayscale correction control will be explained.

A position on a print medium that is printed by a nozzle with a large ink ejection volume (volume of ink droplet) in one ejection operation has a high density, while a position printed by a nozzle with a small ink ejection volume has a low density. A chart (solid chart PT2 of FIG. 15) of a pattern with a uniform density is printed on a print medium. Then actual densities of printed positions are measured and matched against the nozzle positions. Corrections are made to lower the density at portions of the printed image where the measured density is higher than normal and to increase the density at portions where the measured density is lower than normal. This density adjustment to improve an image quality is achieved by a so-called head shading, which modifies a drive control for each nozzle to control the ink ejection volume, as by shortening a drive pulse for nozzles whose ejection volumes are large and raising a drive voltage for nozzles whose ejection volumes are small, and which increases or decreases print data at corresponding positions on an image to be printed. At the same time that the head shading is performed, the ink droplet deviation correction such as described in the preceding embodiment is also performed to enhance an image quality.

Figure 16:
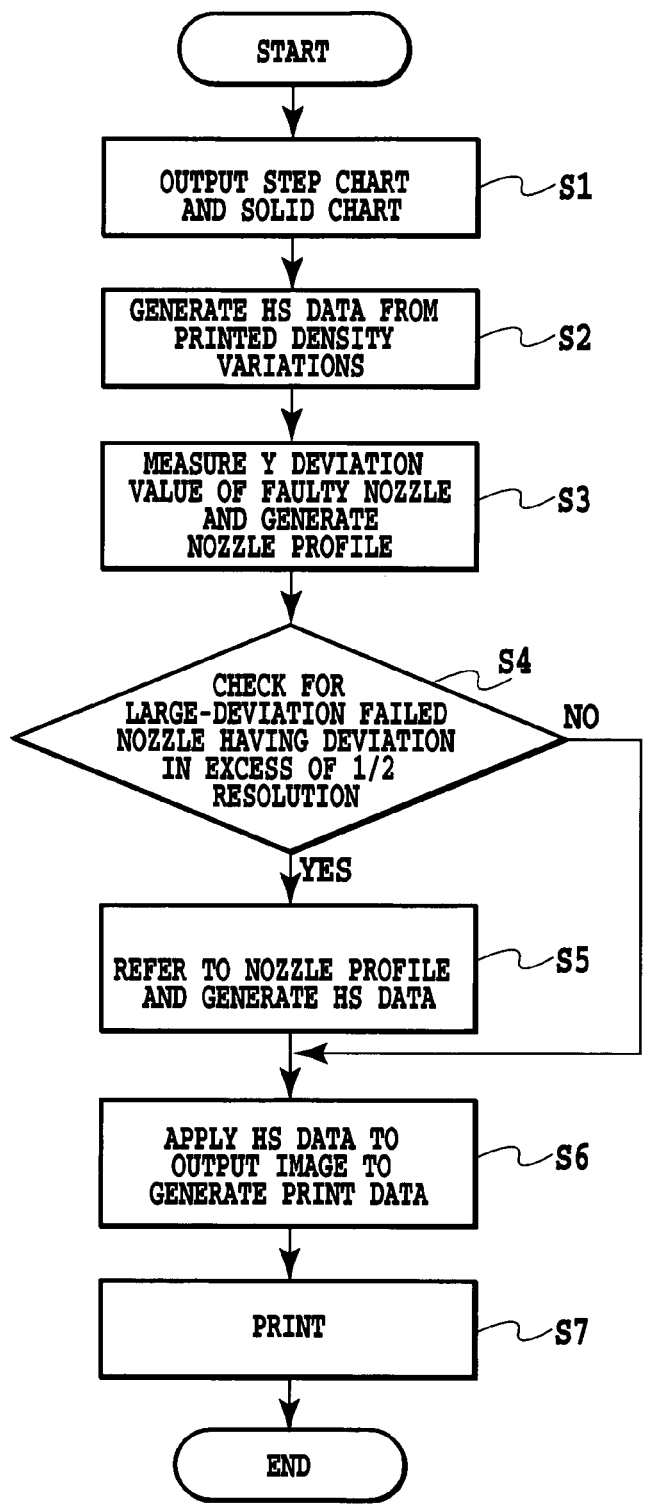
FIG. 16 is a flow chart showing an example control operation in one embodiment of the invention.

In the fifth embodiment of this invention, the control is performed, for example, according to a control sequence of FIG. 16.

First, at step S41, a step chart of a step pattern PT1 and a solid chart of a solid pattern PT2 are printed, as shown in FIG. 15. Next, a printed density of the solid chart is measured by an optical sensor (not shown) and, based on measured density variations in the solid chart PT2, variations in ink ejection volume among nozzles are determined and stored as head shading data (HS data) (step S42).

At step S42, the printed step chart is read by an optical sensor (not shown) and, based on the data thus read, deviations between dot landing positions and an ideal print matrix are measured. This measurement may be done visually. Further, the volumes of ink droplets ejected are measured by printing a dot chart of FIG. 5 and measuring the sizes and shapes of dots that have landed on a print medium with an optical sensor (not shown).

If the result of the measurement finds that some ink dots are not positioned on the ideal print matrix, that their diameters differ from an ideal diameter or that their shapes differ from an ideal shape, then those nozzles that have ejected ink droplets to form these dots are determined as faulty nozzles. Alternatively, without performing the faulty nozzle check step, the processing may proceed to a step of automatically generating nozzle profiles for nearly all nozzles. Other nozzles that are determined to be not faulty do not undergo the correction processing and are allowed to perform a printing operation according to image data.

When there are faulty nozzles, nozzle profile information described later is generated for each of the nozzles making up the print head. That is, in this embodiment, the head shading information (HS) obtained from the solid chart and the nozzle profile information obtained from the step chart are generated.

At step S43, as in the preceding embodiments, a measurement is made of a Y deviation value, which constitutes an important parameter in generating the nozzle profile information.

Following the generation of the nozzle profile information through the measurement of the Y deviation values of the faulty nozzles, step S44 checks the HS data and the nozzle profile data (NP data) for faulty nozzles.

That is, the NP data is checked to see if there is any nozzle that causes so large a dot landing position error with respect to the ideal print matrix as will exceed a predetermined value (in this case, ½ resolution). Such a nozzle is determined as a "large-deviation failed nozzle".

There is also a case where, although the dot landing deviation is small, the ejection volume variation may be large enough to cause a density variation such that a density of an image formed by ejected ink droplets deviates from an appropriate density by an amount in excess of a predetermined allowable range. For example, if a density variation is produced by a certain nozzle during a 1-pass printing of a solid pattern, that nozzle is determined simply as a "faulty nozzle". In real print heads, particularly those with an elongate array of nozzles, large-deviation failed nozzles may concentrate in one area and nozzles with large ejection volume variations in another area. Though in rare cases, the print head may have non-uniform nozzle diameters and shapes and nozzles may even be deformed by stresses. In a conventional practice, a print head containing such nozzles is identified as faulty and entirely disposed of. With this embodiment, however, those print heads that have so far been treated as faulty products can be restored for use depending on how bad the print heads are. Also in the event of worn nozzles caused by a long period of use or ejection-failed nozzles due to ingress of dust or large-deviation failed nozzles, this embodiment can make up for them.

When a large-deviation failed nozzle should occur, HC data (head correction table data) is generated for those nozzles in the vicinity of that failed nozzle by a deviation correction control method described below (step S45). The HC data is integrated with the HS data to generate HS data for the entire print head. Using the generated HS data, a grayscale correction is performed on an output image signal to generate corrected print data (step S46). A printing operation is now executed according to the corrected print data (step S47).

At step S44 above, if no large-deviation failed nozzle is found, the HC data generation at step S45 is omitted and a grayscale correction is performed on image print data by using the HS data which was determined at step S42, i.e., the original HS data not considering the HC data.

In this embodiment, as described above, the HC data generation is not performed for all the nozzles but for only those faulty nozzles that cause large dot position deviations. This embodiment therefore improves the data processing speed substantially when compared with the configuration that generates the HC data for all nozzles. That is, since the large-deviation failed nozzles are very few in comparison with the total number of nozzles of a print head and since this embodiment executes calculation operations for only the very few nozzles, the time it takes to generate the HC data is minimal and has almost no adverse effects on the printing operation as a whole, assuring an efficient printing of an image with a good quality.

While the present invention is particularly effective in a 1-pass printing system, it is also effectively applicable to a so-called multipass printing system in which one and the same print area is scanned multiple times by different groups of print head nozzles to complete an image on that area. In general multipass printing systems, after a faulty nozzle is detected, the area printed by that faulty nozzle is printed by other nozzle groups during different scans to alleviate an image quality degradation caused by the faulty nozzle. With this invention, however, the image quality degradation by a faulty nozzle can be prevented by a simple processing method in virtually the same scan. Combined with the advantage of the multipass printing system, the present invention therefore can form images of even higher quality.

Further, this invention is particularly effective in an ink jet printing apparatus in which a plurality of nozzles are arrayed in a direction almost perpendicular to the printing scan direction in such a way that an interval between adjoining nozzles that can print simultaneously in the same scan is set almost equal to an interval of pixels of an image to be printed, as shown in FIG. 2, i.e., in a full-line type ink jet printing apparatus that completes an image printing in a single scan. The full-line type ink jet printing apparatus basically has advantages over the multipass printing system in that it has a simpler construction and that it has a much faster printing speed. Applying the present invention to the full-line type system can improve an image quality and thus realizes an ink jet printing apparatus with excellent performance in terms of cost, printing speed and image quality.

Where the interval between adjoining nozzles is wider than the interval between adjoining print matrix lines, i.e., the resolution of the print head is lower than that of the print matrix, an interlace system may be employed in which the printing position of the print head is shifted by a distance smaller than the nozzle interval to print dots between the already printed matrix lines of dots, or another print head with a higher resolution may be used which ejects ink droplets of the same color. In that case, even if another print head with a different resolution is used, the printing can be done in virtually the same way with respect to the print matrix as when these print heads perform printing in the same scan. Therefore, this invention can also be applied suitably to the interlace printing system.

However, if those nozzles that print on adjoining matrix lines are actually put close together, the ink jet printer can be constructed in a simpler configuration and print at faster speed, as described above. Therefore, this invention is particularly suited for full-multiple type printers.

Adjoining nozzles are preferably set to the following resolution, depending on a purpose of image printing. For example, when a small-size image, like a so-called pocket picture, is to be ink-jet printed at high quality, adjoining nozzles are preferably set to an interval of about 300 dpi (100 μm) if their ink ejection volume is around 40±10 pl. If the nozzles have an ink ejection volume of about 10±5 pl, they are preferably set closer together at around 600 dpi (40 μm). Further, it is desired that the interval be set to 1,200 dpi (20 μm) for the ink ejection volume of about 5±2 μl and to 2,400 dpi (10 μm) for the ink ejection volume of about 2±1 pl.

Unlike the small-size picture, which is to be viewed close-up, a large-size image that is viewed at some distance is printed with nozzles having a larger ink ejection volume and spaced at relatively wider intervals. In this case, too, this invention is suitably applied.

In addition to the printing apparatus using a print head that ejects ink by a thermal energy generated from electrothermal transducers, this invention is also applicable to printing apparatus with a print head that ejects ink by piezoelectric elements. In other words, the present invention can be applied to any kind of ink jet printing apparatus that ejects ink from nozzles.

EXAMPLE 2

Next, Example 2 of a printing operation performed by the ink jet printing apparatus and the printing method of the fifth embodiment of this invention will be described in the following.

A print head, as in the previous Example 1, has 4,096 nozzles arranged at a resolution of 1,200 dpi, with a single ink ejection volume (volume of an ink droplet) set to 4.5±0.5 pl. Compositions of inks containing colorants are the same as those in Example 1.

A printing operation control was performed according to a sequence shown in the flow chart of FIG. 16.

First, a step chart of FIG. 4 was output and the printed step chart was measured by an optical sensor (scanner) not shown at a resolution of 4,800 dpi. Individual line segments of the step chart were subjected to line-thinning processing to determine gravity centers of ink dots and thereby measure Y deviation values of ink dots from ideal dot landing positions. At the same time, a solid printed chart was also read to determine printed density variations and, according to the previously explained method, generate HS data (density variation correction data). Based on the Y deviation values, NP data (nozzle profile data) were generated for all nozzles.

Ink dots ejected from nozzles had a landing precision of 6 μm in a value and a maximum deviation of ±25 μm. A nozzle that forms an ink dot whose Y deviation value exceeds one-half the nozzle pitch of 1,200 dpi (21.7 μm), i.e., 10.8 μm, is treated as a large-deviation failed nozzle. For nozzles in the vicinity of that large-deviation failed nozzle (for example, five nozzles before and after the large-deviation failed nozzle), estimated printed densities were calculated using their NP data according to the formulas explained earlier to generate HC (dot position deviation correction data). The HC data (for those nozzles in the vicinity of the failed nozzle having a Y deviation value in excess of one-half the resolution) was substituted for the HS data (density variation correction data) to correct a density grayscale value in the print data of an image to be printed for each of the print matrix lines associated with the respective nozzles. Printing operations were executed using the aforementioned kinds of ink. Printed images obtained had a high quality with reduced visible banding and no white stripes.

EXAMPLE 3

In this example, the criterion to determine whether or not a nozzle in question was a failed nozzle was set to 25% of the resolution, with other conditions set equal to those of Example 1. The number of large-deviation failed nozzles was 50%.

In this case, too, a good quality image was obtained but the data processing time doubled because of a doubled number of nozzles requiring the dot deviation correction control.

EXAMPLE 4

In this example, the criterion to determine whether or not a nozzle in question was a failed nozzle was set to 100% of the resolution, with other conditions set equal to those of Example 1. The number of large-deviation failed nozzles was 80%

In this case, too, a good quality image was obtained but the data processing time was longer than the preceding examples because the number of nozzles requiring the dot deviation correction control increased.

EXAMPLE 5

In this example, the criterion to determine whether or not a nozzle in question was a failed nozzle was set to 100% of the resolution, with other conditions set equal to those of Example 1. The number of large-deviation failed nozzles was 1%.

In this case, an image obtained was of a better quality than that obtained with the conventional method but with not as conspicuous an image quality improvement as in Example 1. However, the data processing time was significantly reduced, when compared with the preceding examples.

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An ink jet printing apparatus which forms an image on a print medium by moving a print head having an away of nozzles and the print medium relative to each other and at the same time ejecting ink droplets from the nozzles according to print data of the image to be printed, the ink jet printing apparatus comprising:
   nozzle information generation means for generating nozzle information representing an ejection characteristic of each nozzle according to a result of measuring a landing state of each of dots formed by the ink droplets which are ejected from the nozzles of the print head onto the print medium by measuring the landing state coffesponding to each of the nozzles;
   estimation means for estimating, for each nozzle of the plurality of nozzles based on the nozzle information, a degree of influence which affects the density of an image at a position of a dot to be formed by an ink droplet ejected from the nozzle, the degree of influence being affected by both the nozzle corresponding to the position of the dot to be formed and another nozzle in the neighborhood of the nozzle;
   correction information generation means for generating correction information to correct an ink ejection condition of each nozzle according to a result of estimation by the estimation means; and
   control means for controlling a driving of the nozzles according to the print data and the correction information,
   wherein the nozzle information generation means generates information which represents nozzle ejection characteristics according to a result of measuring an amount of deviation between an ideal landing position of the ink droplet ejected from each of the nozzles of the print head onto the print medium and an actual landing position of the ink droplet ejected from each of the nozzles of the print head onto the print medium, and
   wherein the estimation means obtains the degree of influence which affects the density of the image at the position of the dot by obtaining a dot area, present within a target area, of the dot formed by an ink droplet ejected from a nozzle corresponding to a predetermined position of the dot and a dot area, present within the target area, of the dot formed by an ink droplet ejected from the other nozzle, based on an amount of deviation corresponding to each of the plurality of nozzles.

2. An ink jet printing apparatus according to claim 1, wherein the nozzle information generation means determines, as the nozzle information representing the ejection characteristic of each nozzle, an ink ejection enable/disable decision for each nozzle of the print head and a size and/or shape of an ink dot formed by each ink droplet landing on the print medium.

3. An ink jet printing apparatus according to claim 1, wherein the estimation means at least analyzes a component affecting a print density on the print medium.

4. An ink jet printing apparatus according to claim 3, wherein the component affecting the print density is a range of print area to be printed by the ink dot and an area overrunning the range of print area.

5. An ink jet printing apparatus according to claim 1, wherein, in a process of forming an image, the correction information generation means generates, based on an estimated result from the estimation means, the correction information to correct the ink ejection conditions of nozzles unable to produce an ideal landing state.

6. An ink jet printing method which forms an image on a print medium by moving a print head having an away of nozzles and the print medium relative to each other and at the same time ejecting ink droplets from the nozzles according to print data of the image to be printed, the ink jet printing method comprising:
   a nozzle information generation step for generating nozzle information representing an ejection characteristic of each nozzle according to a result of measuring a landing state of each of dots formed by the ink droplets which are ejected from the nozzles of the print head onto the print medium by measuring the landing state corresponding to each of the nozzles;
   an estimation step for estimating, for each nozzle of the plurality of nozzles based on the nozzle information, a degree of influence which affects the density of an image at a position of a dot to be formed by an ink droplet ejected from the nozzle, the degree of influence being affected by both the nozzle corresponding to the position of the dot to be formed and another nozzle in the neighborhood of the nozzle;
   a correction information generation step for generating correction information to correct an ink ejection condition of each nozzle according to a result of estimation by the estimation step; and
   a control step for controlling a driving of the nozzles according to the print data and the correction information,
   wherein said nozzle information generation step generates information which represents nozzle ejection characteristics according to a result of measuring an amount of deviation between an ideal landing position of the ink droplet ejected from each of the nozzles of the print head onto the print medium and an actual landing position of the ink droplet ejected from each of the nozzles of the print head onto the print medium, and wherein said estimation step obtains the degree of influence which affects the density of the image at the position of the dot by obtaining a dot area, present within a target area, of the dot formed by an ink droplet ejected from a nozzle corresponding to a predetermined position of the dot and a dot area, present within the target area, of the dot formed by an ink droplet ejected from the other nozzle, based on an amount of deviation corresponding to each of the plurality of nozzles.

7. An ink jet printing method according to claim 6, wherein the nozzle information generation step determines, as the nozzle information representing the ejection characteristic of each nozzle, an ink ejection enable/disable decision for each nozzle of the print head and a size and/or shape of an ink dot formed by each ink droplet landing on the print medium.

8. An ink jet printing method according to claim 6, wherein the estimation step at least analyzes a component affecting a print density on the print medium.

9. An ink jet printing method according to claim 6, wherein, in a process of forming an image, the correction information generation step generates, based on an estimated result from the estimation step, the correction information to correct the ink ejection conditions of nozzles unable to produce an ideal landing state.

10. An ink jet printing apparatus which forms an image on a print medium by moving a print head having an away of nozzles and the print medium relative to each other and at the same time ejecting ink droplets from the nozzles according to print data of the image to be printed, the ink jet printing apparatus comprising:

deviation correction means for performing a dot deviation correction based on deviation data representing an amount of deviation, or a difference, between an actual landing position of an ink dot formed on the print medium by the ink droplet ejected from each nozzle and an ideal landing position of the ink dot; and control means for selectively causing the deviation correction means to execute the dot deviation correction according to the amount of deviation, wherein the amount of deviation is an amount which is obtained according to a result of measuring a landing state of each of the dots formed by the ink droplets ejected from nozzles of the print head onto the print medium by measuring the amount of deviation between the ideal landing position of the ink droplet ejected from each of the nozzles of the print head onto the print medium and the actual landing position of the ink droplet ejected from each of the nozzles of the print head onto the print medium, and the deviation correction means performs the dot deviation correction by obtaining a dot area, present within a target area, of the dot formed by an ink droplet ejected from a nozzle coffesponding to a predetermined position of the dot and a dot area. present within the target area, of the dot formed by an ink droplet ejected from another nozzle, based on an amount of deviation coffesponding to each of the plurality of nozzles.

11. An ink jet printing apparatus which forms an image on a print medium by moving a print head having an away of nozzles and the print medium relative to each other and at the same time ejecting ink droplets from the nozzles according to print data of the image to be printed, the ink jet printing apparatus comprising:

grayscale correction means for performing an ink dot grayscale correction according to density difference data representing a density difference between an actual density of an ink dot formed on the print medium and an ideal density of the dot;

deviation correction means for performing a dot deviation correction based on deviation data representing an amount of deviation, or a difference, between an actual landing position of an ink dot formed on the print medium by the ink droplet ejected from each nozzle and an ideal landing position of the ink dot; and control means for controlling the grayscale correction means and the deviation correction means according to at least the density difference and the amount of deviation, wherein the amount of deviation is an amount which is obtained according to a result of measuring a landing state of each of the dots formed by the ink droplets ejected from nozzles of the print head onto the print medium by measuring the amount of deviation between the ideal landing position of the ink droplet ejected from each of the nozzles of the print head onto the print medium and the actual landing position of the ink droplet ejected from each of the nozzles of the print head onto the print medium, and the deviation correction means performs the dot deviation correction by obtaining a dot area, present within a target area, of the dot formed by an ink droplet ejected from a nozzle coffesponding to a predetermined position of the dot and a dot area, present within the target area, of the dot formed by an ink droplet ejected from another nozzle, based on an amount of deviation coffesponding to each of the plurality of nozzles.

12. An ink jet printing apparatus according to claim 10 or 11, wherein, when the amount of deviation of an ink dot of interest is found to be greater than a predetermined value, the control means causes the deviation correction means to execute the dot deviation correction.

13. An ink jet printing apparatus according to claim 12, wherein the deviation correction means corrects an ink ejection condition of at least one influencing nozzle that adversely affects an ink dot of interest in landing on the ideal landing position.

14. An ink jet printing apparatus according to claim 13, wherein the at least one influencing nozzle includes at least one of a nozzle for ejecting an ink droplet to form the ink dot of interest and adjoining nozzles.

15. An ink jet printing apparatus according to claim 12, wherein, when the amount of deviation of the ink dot of interest exceeds 10% of a nozzle pitch, the control means causes the deviation correction means to execute the dot deviation correction.

16. An ink jet printing apparatus according to claim 12, wherein, when the amount of deviation of the ink dot of interest exceeds 25% of a nozzle pitch, the control means causes the deviation correction means to execute the dot deviation correction.

17. An ink jet printing apparatus according to claim 11, wherein the grayscale correction means corrects, based on the density data, an ink ejection condition of a nozzle corresponding to the density data.

18. An ink jet printing apparatus according to claim 10 or 11, wherein the deviation correction means increases or decreases a volume of an ink droplet ejected from an influencing nozzle according to the amount of deviation, the influencing nozzle being a nozzle that adversely affects an ink dot of interest in landing on the ideal landing position.

19. An ink jet printing apparatus according to claim 11, wherein the grayscale correction means increases or decreases a volume of ink droplet ejected from the nozzle according to a magnitude of the density difference.

20. An ink jet printing apparatus according to claim 11, wherein the control means controls the deviation correction means and/or the grayscale correction means according to nozzle information representing at least one ejection characteristic of each nozzle, the at least one ejection characteristic including at least one of an ink ejection enable/disable decision for each nozzle and a size and/or shape of an ink dot.

21. An ink jet printing method which forms an image on a print medium by moving a print head having an away of nozzles and the print medium relative to each other and at the same time ejecting ink droplets from the nozzles according to print data of the image to be printed, the ink jet printing method comprising:

a deviation correction step for performing a dot deviation correction based on deviation data representing an amount of deviation, or a difference, between an actual landing position of an ink dot formed on the print medium by the ink droplet ejected from each nozzle and an ideal landing position of the ink dot; and a control step for selectively causing the deviation correction step to execute the dot deviation correction according to the amount of deviation, wherein the amount of deviation is an amount which is obtained according to a result of measuring a landing state of each of the dots formed by the ink droplets ejected from nozzles of the print head onto the print medium by measuring the amount of deviation between the ideal landing position of the ink droplet ejected from each of the nozzles of the print head onto the print medium and the actual landing position of the ink droplet ejected from each of the nozzles of the print head onto the print medium, and the deviation correction step performs the dot deviation correction by obtaining a dot area, present within a target area, of the dot formed by an ink droplet ejected from a nozzle coffesponding to a predetermined position of the dot and a dot area, present within the target area, of the dot formed by an ink droplet ejected from another nozzle, based on an amount of deviation coffesponding to each of the plurality of nozzles.

22. An ink jet printing method which forms an image on a print medium by moving a print head having an away of nozzles and the print medium relative to each other and at the same time ejecting ink droplets from the nozzles according to print data of the image to be printed, the ink jet printing method comprising:

a grayscale correction step for performing an ink dot grayscale correction according to density difference data representing a density difference between an actual density of an ink dot formed on the print medium and an ideal density of the dot;

a deviation correction step for performing a dot deviation correction based on deviation data representing an amount of deviation, or a difference, between an actual landing position of an ink dot formed on the print medium by the ink droplet ejected from each nozzle and an ideal landing position of the ink dot; and a control step for controlling the grayscale correction step and the deviation correction step according to at least the density difference and the amount of deviation, wherein the amount of deviation is an amount which is obtained according to a result of measuring a landing state of each of the dots formed by the ink droplets ejected from nozzles of the print head onto the print medium by measuring the amount of deviation between the ideal landing position of the ink droplet ejected from each of the nozzles of the print head onto the print medium and the actual landing position of the ink droplet ejected from each of the nozzles of the print head onto the print medium, and the deviation correction step performs the dot deviation correction by obtaining a dot area, present within a target area, of the dot formed by an ink droplet ejected from a nozzle coffesponding to a predetermined position of the dot and a dot area, present within the target area, of the dot formed by an ink droplet ejected from another nozzle, based on an amount of deviation corresponding to each of the plurality of nozzles.

\* \* \* \* \*

UNITED STATES PATENT AND TRADEMARK OFFICE
CERTIFICATE OF CORRECTION

PATENT NO. : 7,201,462 B2
APPLICATION NO. : 10/622479
DATED : April 10, 2007
INVENTOR(S) : Shibata et al.

It is certified that error appears in the above-identified patent and that said Letters Patent is hereby corrected as shown below:

COLUMN 4:
Line 39, "the-correction" should read --the correction--.

COLUMN 8:
Lines 32 and 33 should be merged into the same paragraph.

COLUMN 14:
Line 42, "Information." should read --information--.

COLUMN 18:
Line 61, "Input" should read --input--.

COLUMN 23:
Line 37, "away" should read --array--.
Line 48, "coffesponding" should read --corresponding--.

COLUMN 24:
Line 35, "away" should read --array--.

COLUMN 25:
Line 29, "away" should read --array--.
Line 57, "coffesponding" should read --corresponding--.
Line 58, "area." should read --area--.
Line 60, "cof-" should read --corresponding--.
Line 61, "fesponding" should be deleted.
Line 63, "away" should read --array--.

COLUMN 26:
Line 29, "coffesponding" should read --corresponding--.
Line 32, "cof-" should read --corresponding--.
Line 33, "fesponding" should be deleted.

COLUMN 27:
Line 14, "away" should read --array--.
Line 41, "coffesponding" should read --corresponding--.

UNITED STATES PATENT AND TRADEMARK OFFICE
CERTIFICATE OF CORRECTION

PATENT NO. : 7,201,462 B2
APPLICATION NO. : 10/622479
DATED : April 10, 2007
INVENTOR(S) : Shibata et al.

It is certified that error appears in the above-identified patent and that said Letters Patent is hereby corrected as shown below:

COLUMN 28:
Line 1, "cof-" should read --corresponding--.
Line 2, "fesponding" should be deleted.
Line 4, "away" should read --array--.
Line 37, "coffesponding" should read --corresponding--.

Signed and Sealed this

Seventeenth Day of February, 2009

JOHN DOLL
*Acting Director of the United States Patent and Trademark Office*